United States Patent [19]
Matsuzaki et al.

[11] Patent Number: 5,093,681
[45] Date of Patent: Mar. 3, 1992

[54] FLASH APPARATUS FOR SWITCHING AND SELECTING EMISSION MODES OF OPEN AND AUTOMATIC CONTROL SCHEMES

[75] Inventors: Minoru Matsuzaki, Hachioji; Masaki Tokui, Shiroyama, both of Japan

[73] Assignee: Olympus Optical Co., Ltd., Tokyo, Japan

[21] Appl. No.: 549,470

[22] Filed: Jul. 6, 1990

[30] Foreign Application Priority Data

Jul. 10, 1989 [JP] Japan .................. 1-177394

[51] Int. Cl.$^5$ .............................. G03B 15/03
[52] U.S. Cl. .................. 354/416; 354/145.1; 354/149.1
[58] Field of Search ............... 354/416, 149.1, 195.12, 354/418, 471, 127.12, 417, 145.1

[56] References Cited

U.S. PATENT DOCUMENTS

| | | | |
|---|---|---|---|
| 4,078,240 | 3/1978 | Kaneko et al. | 354/149.1 |
| 4,494,850 | 1/1985 | Katsuma | 354/416 |
| 4,857,951 | 8/1989 | Nakajima et al. | 354/400 |

FOREIGN PATENT DOCUMENTS 62-264032  11/1987  Japan .

*Primary Examiner*—L. T. Hix
*Assistant Examiner*—David M. Gray
*Attorney, Agent, or Firm*—Frishauf, Holtz, Goodman & Woodward

[57] ABSTRACT

A flash apparatus which is detachably mounted on a camera main body is operated in a light emission mode of an open control scheme, in which the light emission amount of the light-emitting portion is controlled by a preset guide number, and in a light emission mode of an automatic control scheme, in which the light emission amount of the light-emitting portion is controlled by a metering result obtained by metering light reflected by an object to be photographed. The flash apparatus includes one of the following switches a bounce state detection switch which is turned on when the light emission axis of the light-emitting portion is inclined with respect to the optical axis of a photographing lens, an OFF-camera detection switch which is turned on when the flash apparatus is to be used while it is detached from the camera main body, and a converter mounting detection switch which is turned on when a converter is mounted on the photographing lens. A CPU of the flash apparatus forcibly switches the apparatus to the light emission mode of the automatic control scheme when any one of the detection switches is turned on.

8 Claims, 28 Drawing Sheets

| LIGHT EMISSION MODE | | OK-STATE CONDITIONS OF AUTO CHECK LED (LED 107) |
|---|---|---|
| LIGHT EMISSION AMOUNT AUTOMATIC CHANGING MODE | GNO CONTROL | WHEN DESIGNATED GNO FROM CAMERA $\leq$ ALLOWABLE GNO ESTIMATED FROM A/D VOLTAGE IMMEDIATELY BEFORE FLASHING OPERATION IN CONSIDERATION OF SECONDARY VOLTAGE IN FLASHING OPERATION IS ESTABLISHED IN FLASHING OPERATION |
| | AUTOMATIC CONTROL | WHEN LIGHT INPUT FROM AE SENSOR 6a REACHES DETERMINATION VOLTAGE (PROPER VOLTAGE) OF DETERMINING CIRCUIT, AFTER FLASHING OPERATION |
| LIGHT EMISSION AMOUNT FIXING MODE | MANUAL CONTROL | NO DISPLAY |
| | MULTI-LIGHT-EMISSION CONTROL | NO DISPLAY |

F I G. 7

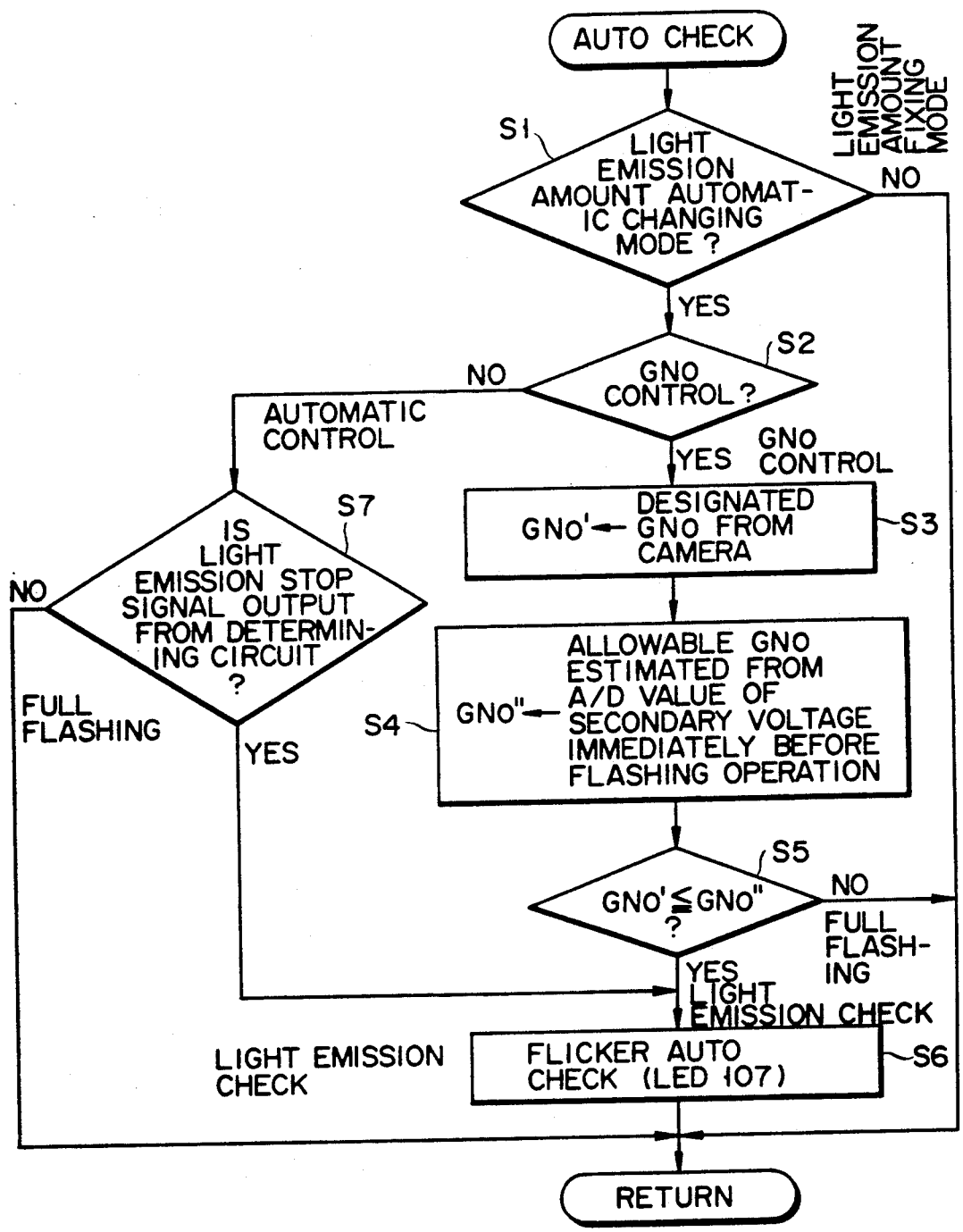
F I G. 8

| LIGHT EMISSION MODE \ CAMERA MODE | LIGHT EMISSION AMOUNT AUTOMATIC CHANGING MODE | | | | | LIGHT EMISSION AMOUNT FIXING MODE (GNO CONTROL) | |
|---|---|---|---|---|---|---|---|
| | FRONT CURTAIN SYNCHRONIZATION | | REAR CURTAIN SYNCHRONIZATION | | | MANUAL (GNO 3 STEPS) | MULTI-LIGHT-EMISSION |
| | NORMAL | BOUNCE OFF-CAMERA CONVERTER | NORMAL | BOUNCE OFF-CAMERA CONVERTER | | | |
| PRG | GNO CONTROL ✕1 | AUTOMATIC CONTROL ✕4 | GNO CONTROL | AUTOMATIC CONTROL | | MANUAL (GNO 3STEPS) | MULTI-LIGHT-EMISSION |
| AV | GNO CONTROL | AUTOMATIC CONTROL | GNO CONTROL | AUTOMATIC CONTROL | | INHIBITION | INHIBITION |
| TV | GNO CONTROL | AUTOMATIC CONTROL | GNO CONTROL | AUTOMATIC CONTROL | | INHIBITION | INHIBITION |
| MANUAL | INHIBITION | INHIBITION | INHIBITION | INHIBITION | | MANUAL ✕2 | MULTI-LIGHT-EMISSION ✕3 |
| CAMERA POWER OFF/NONE | INHIBITION | INHIBITION | INHIBITION | INHIBITION | | MANUAL | MULTI-LIGHT-EMISSION |

✕1 ✕2 ✕3  LIGHT EMISSION CONTROL OF OPEN CONTROL SCHEME
  ✕1  GNO CONTROL    GNO LINEAR CHANGING MODE
  ✕2  GNO CONTROL    3-STEP GNO FIXING MODE
  ✕3  GNO CONTROL    MULTI-LIGHT-EMISSION MODE
✕4 LIGHT EMISSION CONTROL OF AUTOMATIC CONTROL SCHEME USING FIXED GNO

F I G. 9

| SHUTTER SPEED | LIGHT EMISSION INTERVAL | LIGHT EMISSION COUNT |
|---|---|---|
| 1/100 | | 1 |
| 1/60 | | 1 |
| 1/30 | 12.5m sec | 2 |
| 1/15 | 12.5m sec | 5 |
| 1/8 | 12.5m sec | 10 |
| 1/4 | 12.5m sec | 20 |
| 1/2 | 25m sec | 20 |
| 1sec OR MORE | 50m sec | 20 |

FIG. 11

| $GN_H$ | TIME ($\mu$ sec) |
|---|---|
| 4 | 14 |
| 5 | 16 |
| ... | ... |
| 24 | 200 |

F I G. 13

| | NAME | SIGNAL FLOW |
|---|---|---|
| STDT | DATA COMMUNICATION TERMINAL | CAMERA→FLASH APPARATUS |
| STCK | CLOCK TERMINAL | CAMERA→FLASH APPARATUS |
| EXCNT | LIGHT EMISSION SIGNAL TERMINAL | CAMERA→FLASH APPARATUS |
| GND | GROUND TERMINAL | |

F I G. 14

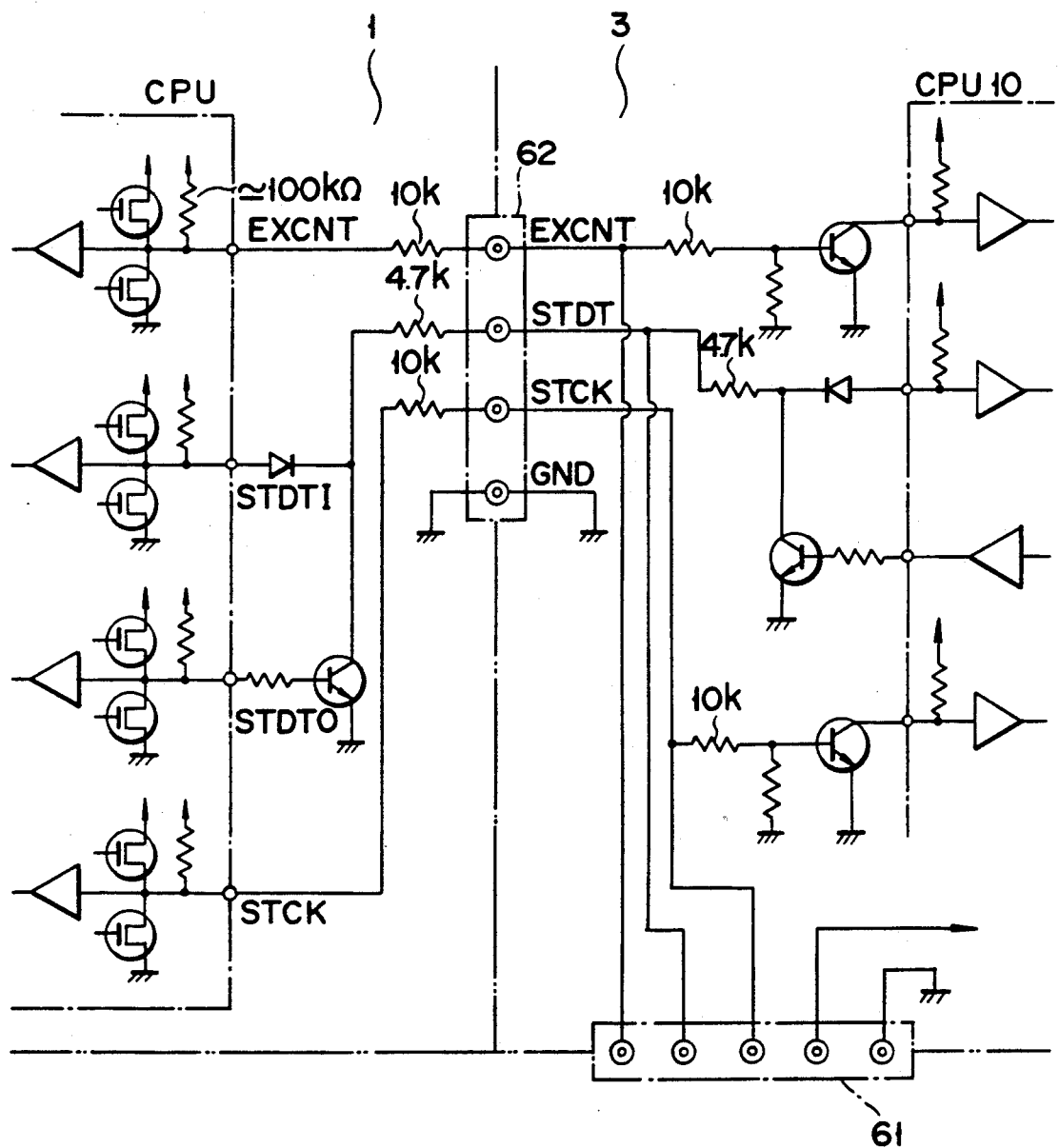
F I G. 15

| LIGHT EMISSION MODE | | BIT | 1 | 2 | 3 | 4 | 5 | 6~8 |
|---|---|---|---|---|---|---|---|---|
| | | ITEM | ON/OFF | CHARGE LEVEL | EXTERNAL FLASH APPARATUS MODE | GNO/AUTOMATIC MODE | PROPER LIGHT EMISSION | MAXIMUM GNO |
| AUTO (CAMERA) MODE | FRONT CURTAIN SYNCHRO-NIZATION | NO BOUNCE | o | x | 1 | 0 | x | xxx |
| | | BOUNCE (AUTO) OFF-CAMERA | o | x | 1 | 1 | x | xxx |
| | REAR CURTAIN SYNCHRO-NIZATION | NO BOUNCE | o | x | 0 | 0 | x | xxx |
| | | BOUNCE (AUTO) OFF-CAMERA | o | x | 0 | 1 | x | xxx |
| MANUAL MODE (BOUNCE: OFF-CAMERA) | MANUAL LIGHT EMISSION (GNO 3 STEPS) | | o | x | 1 | x | x | xxx |
| | MULTI-LIGHT EMISSION MODE | | o | x | 0 | x | x | xxx |

X : 1 OR 0

F I G. 16

| 9~12 | ZOOM FOCAL LENGTH | ⑨ | ⑩ | ⑪ | ⑫ | $\{f=2^{(n/4)+4}\}$ |
|---|---|---|---|---|---|---|
| | | 0 | 0 | 0 | 0 | f = 16 mm |
| | | 0 | 0 | 0 | 1 | f = 19 mm |
| | | 0 | 0 | 1 | 0 | f = 23 mm |
| | | 0 | 0 | 1 | 1 | f = 27 mm |
| | | 0 | 1 | 0 | 0 | f = 32 mm |
| | | 0 | 1 | 0 | 1 | f = 38 mm |
| | | 0 | 1 | 1 | 0 | f = 45 mm |
| | | 0 | 1 | 1 | 1 | f = 54 mm |
| | | 1 | 0 | 0 | 0 | f = 64 mm |
| | | 1 | 0 | 0 | 1 | f = 76 mm |
| | | 1 | 0 | 1 | 0 | f = 91 mm |
| | | 1 | 0 | 1 | 1 | f = 108 mm |
| | | 1 | 1 | 0 | 0 | f = 128 mm |
| | | 1 | 1 | 0 | 1 | f = 152 mm |
| | | 1 | 1 | 1 | 0 | f = 181 mm |
| | | 1 | 1 | 1 | 1 | f = 215 mm |

FIG. 17

| BIT | ITEM | CONTENTS |
|---|---|---|
| 13 ~ 18 | GNO | $(\log_2(\text{GNO})) \times 8$<br>GNO 1.4 → "000100" ( 4)<br>GNO 16 → "100000" (32)<br>GNO 40 → "101011" (43) |
| 19 ~ 24 | ISO | $(\log_2(\text{ISO}/100)) \times 4 + 28$<br>ISO 25 → "010100" (20)<br>ISO 100 → "011100" (28)<br>ISO 800 → "101000" (40) |
| 25 ~ 30 | APERTURE | $(\log_2(\text{APERTURE VALUE})) \times 8$<br>APERTURE 1.2 → "000010" ( 2)<br>APERTURE 5.6 → "010100" (20)<br>APERTURE 22 → "100100" (36) |
| 31 ~ 36 | SHUTTER SPEED | $(\log_2(1/\text{SPEED})) \times 4 + 24$<br>10s → "001010" (10)<br>1s → "011000" (24)<br>1/100s → "110011" (51) |

F I G. 18

| BIT | ITEM | "0" | "1" |
|---|---|---|---|
| 1 | EXTERNAL FLASH APPARATUS ON/OFF | ON | OFF OR NO FLASH APPARATUS (STANDBY) |
| 2 | CHARGE LEVEL | NOT CHARGED (BEING CHARGED) | LIGHT EMISSION ENABLE LEVEL |
| 3 | EXTERNAL FLASH APPARATUS MODE | FRONT CURTAIN SYNCHRONIZATION/ MANUAL LIGHT EMISSION | REAR CURTAIN SYNCHRONIZATION/ MULTI LIGHT EMISSION |
| 4 | CONTROL STATE OF EXTERNAL FLASH APPARATUS | CONTROL BY GNO SENT FROM CAMERA | CONTROL BY SENSOR IN FLASH APPARATUS (AUTOMATIC LIGHT EMISSION) |
| 5 | PROPER LIGHT EMISSION | PROPER LIGHT EMISSION IS PERFORMED | PROPER LIGHT EMISSION IS NOT PERFORMED |
| 6~8 | MAXIMUM GNO OF EXTERNAL FLASH APPARATUS | ⑥⑦⑧ GNo<br>0 0 0 16 OR LESS<br>0 0 1 19<br>0 1 0 23<br>0 1 1 27 | ⑥⑦⑧ GNo<br>1 0 0 32<br>1 0 1 38<br>1 1 0 45<br>1 1 1 54 OR MORE |

FIG. 19

| BIT | 1·2 | 3 | 4·5 | 6 | 7·8 | 9~12 | 13~18 | 19~24 | 25~30 | 31~36 |
|---|---|---|---|---|---|---|---|---|---|---|
| CAMERA OPERATION \ ITEM | TYPE | LIGHT EMISSION PERMISSION | CAMERA MODE | AUXILIARY LIGHT | | ZOOM | GNO | ISO | APERTURE | SHUTTER SPEED |
| PER ABOUT 100msec | xx | 0 | xx | x | xx | x~x | NO COMMUNICATION | | | |
| BEFORE LIGHT EMISSION | xx | 1 | xx | x | xx | x~x | x~x | x~x | x~x | x~x |
| AFTER LIGHT EMISSION | xx | 0 | xx | x | xx | x~x | NO COMMUNICATION | | | |
X : 1 OR 0
F I G. 21
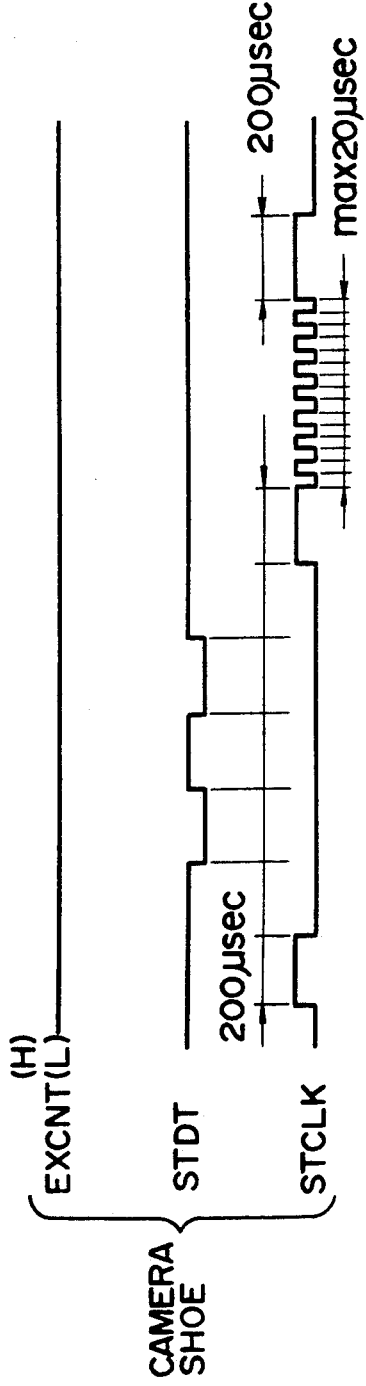
F I G. 23

| BIT | ITEM | CONTENTS | |
|---|---|---|---|
| 1·2 | APPARATUS TYPE CODE | ① ②<br>0 0 ✱✱✱-1<br>1 0 ✱✱✱-2 | ① ②<br>0 1 ✱✱✱-3<br>1 1 ✱✱✱-4 |
| 3 | EXTERNAL FLASH APPARATUS LIGHT EMISSION PERMISSION/ INHIBITION | 0<br>1 | FLASHING OPERATION IS INHIBITED<br>FLASHING OPERATION IS PERMITTED |
| 4~5 | CAMERA MODE | ④ ⑤<br>0 0<br>1 0<br>0 1<br>1 1 | PRG MODE<br>AV MODE<br>TV MODE<br>MANU MODE |
| 6 | AUXILIARY LIGHT CONTROL | 0<br>1 | AUXILIARY LIGHT IS TURNED ON<br>AUXILIARY LIGHT IS TURNED OFF |
| 7·8 | SPARE | | |

F I G. 22

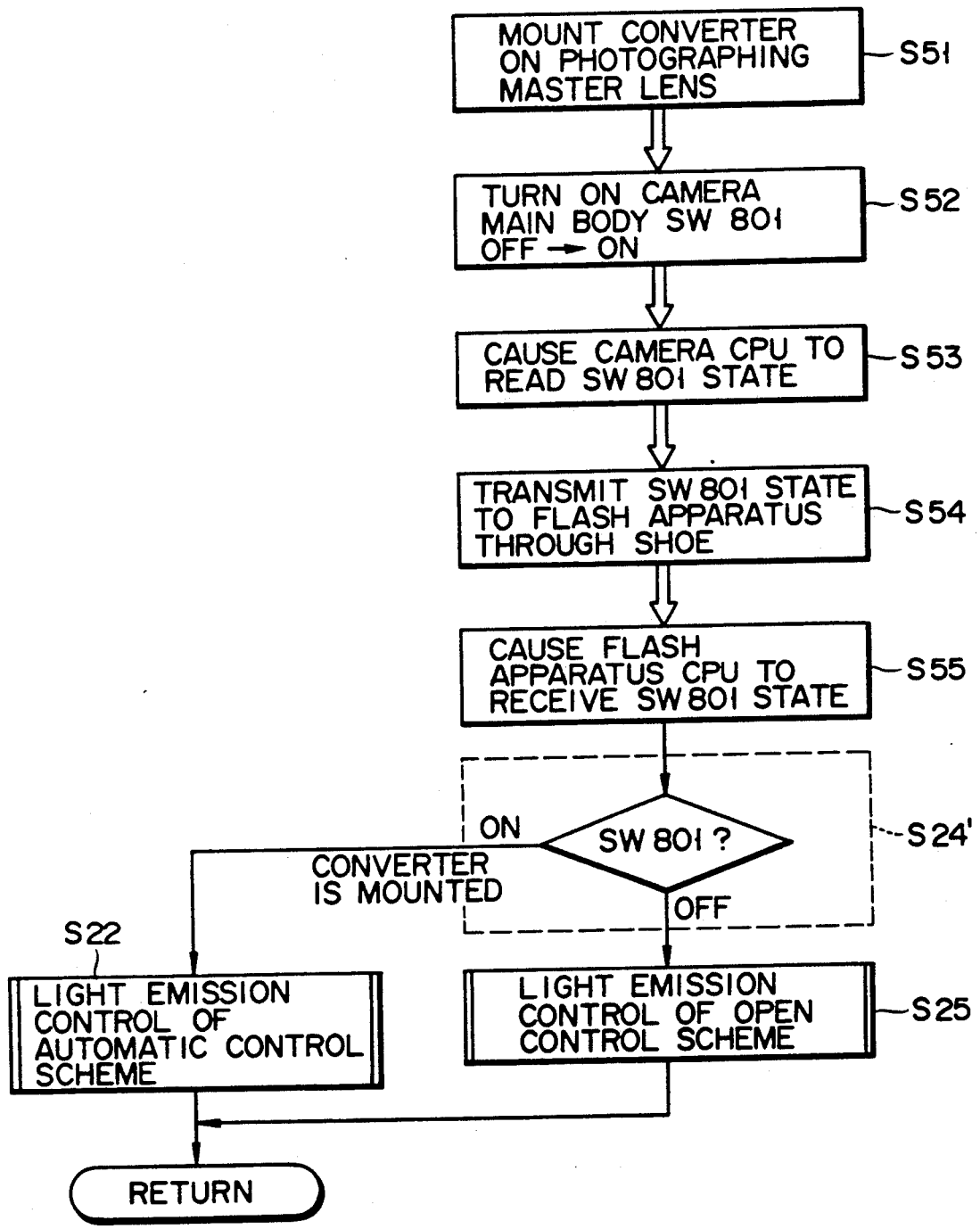
F I G. 30

FLASH APPARATUS FOR SWITCHING AND SELECTING EMISSION MODES OF OPEN AND AUTOMATIC CONTROL SCHEMES

BACKGROUND OF THE INVENTION

1. Field of the Invention

The present invention relates to a flash apparatus having a plurality of light emission modes of different light emission control schemes.

2. Description of the Related Art

As is well known, a conventional flash apparatus has emission modes of the following two light emission control schemes.

One of the modes is a light emission mode of an automatic control scheme called a normal (external light) automatic scheme or TTL (through the lens) automatic scheme. In this scheme, light emitted by flashing and reflected by an object to be photographed is received by a sensor, and a signal representing the amount of received light is fed back to the flash apparatus, thereby adjusting the light emission amount of the apparatus and providing a proper exposure value.

The other mode is a light emission mode of a so-called open control scheme such as a guide number scheme or a flashmatic scheme. In this scheme, a light emission amount is determined by calculating a proper light emission amount in advance on the basis of data associated with flash photography, which are set in the camera, such as an aperture value, an object distance, a film speed, and an exposure correction value.

For example, according to the guide number scheme as a typical example of this open control scheme, a required light emission amount of the flash apparatus is determined on the basis of aperture value data FNo from an aperture control means, object distance data d (meters) from a distance measuring means, a preset film speed ISO, and an exposure correction value. That is, if ISO=100 and the exposure correction value is ±0 ev, a required guide number GNo is given by:

$$GNo = d(m) \times FNo \qquad (1)$$

Equation (1), however, can be established only when the flash apparatus opposes an object to be photographed. When the flash apparatus is to be used in, e.g., a bounce state in which the light emission axis of the apparatus is inclined, equation (1) is not established. In such a case, the following equation (2) must be used:

$$GNo = d(m) \times FNo \times k \qquad (2)$$

where k is a constant which satisfies $k \leq 1$.

Since the constant k is determined by the ratio of direct light to reflected light, this value greatly varies depending on a photographic condition, resulting in photography with incorrect exposure.

In this guide number scheme, when the flash apparatus is to be used while it is detached from the camera (OFF-camera state), neither of equations (1) and (2) are established. The following equation (3) must be used instead:

$$GNo = d'(m) \times FNo \qquad (3)$$

where d' is the distance (meters) between the flash apparatus and an object to be photographed.

In this case, however, the distance d' between the flash apparatus and the object cannot be obtained by using a distance output from the distance measuring means on the camera side, and must be measured with the eyes. For this reason, when the flash apparatus is to be used in an OFF-camera state, proper exposure control cannot be expected. In order to realize correct exposure, the distance d' between the flash apparatus and the object must be measured by a cumbersome measuring operation using a measure or the like.

As described above, in the guide number scheme, when the flash apparatus is to be used in a bounce state or an OFF-camera state, proper exposure control cannot be expected. In order to perform proper exposure control in an OFF-camera state, a cumbersome measuring operation must be performed.

In addition, in the guide number scheme, as disclosed in Published Unexamined Japanese Patent Application No. 62-264032, a required light emission amount is determined by obtaining the object distance data d (meters) on the basis of defocus data from automatic focusing output data. If, however, a front converter (focal length/magnification conversion lens) is mounted on the front end portion of a photographing master lens, the data of the distance from the master lens to the object is deviated from the proper data. On the other hand, the aperture value of the master lens is not changed after the front converter is mounted on the master lens. Therefore, if the front converter is mounted, the guide number GNo is given by:

$$GNo = d''(m) \times FNo \qquad (4)$$

where d'' is the distance (meters) between the flash apparatus and the object, which is corrected upon mounting of the front converter.

If a rear converter is mounted on the rear end portion of the photographing lens, the aperture value of the master lens is changed from that of the master lens before the rear converter is mounted, although the data of the distance from the master lens to the object is correct. Therefore, if the rear converter is mounted, the guide number GNo is given by:

$$GNo = d(m) \times FNo' \qquad (5)$$

when FNo' is the aperture value data of the master lens, which is corrected upon mounting of the rear converter.

As described above, in order to calculate a required light emission amount upon mounting of a converter, distance data or aperture value data must be corrected. This requires cumbersome operations.

SUMMARY OF THE INVENTION

It is an object of the present invention to provide a new flash apparatus in which light emission modes based on an open control scheme and an automatic control scheme are organically combined with each other so as to perform a proper flashing operation by automatically switching the two light emission modes in accordance with each photographic condition.

In order to achieve the above object, according to the first aspect of the present invention, there is provided a flash apparatus comprising a light-emitting portion whose light emission axis can be inclined with respect to an optical axis of a photographing lens, first control means for controlling a light emission amount of the light-emitting portion on the basis of a preset guide number, second control means for metering light reflected by an object to be photographed and controlling the light emission amount of the light-emitting portion on the basis of the metering result, detection means for detecting that the light emission axis of the light-emitting portion is inclined with respect to the optical axis of the photographing lens, and selecting means for inhibiting the first control means from controlling the light emission amount of the light-emitting portion and causing the second control means to control the light emission amount of the light-emitting portion when the detection means detects that the light emission axis of the light-emitting portion is inclined with respect to the optical axis of the photographing lens.

According to the second aspect of the present invention there is provided a flash apparatus comprising a light-emitting portion detachably mounted on a camera main body, first control means for controlling a light emission amount of the light-emitting portion on the basis of a preset guide number, second control means for metering light reflected by an object to be photographed and controlling the light emission amount of the light-emitting portion on the basis of the metering result, detection means for detecting when the light-emitting portion is detached from the camera main body, and selecting means for inhibiting the first control means from controlling the light emission amount of the light-emitting portion and causing the second control means to control the light emission amount of the light-emitting portion when the detection means detects that the light-emitting portion is detached from the camera main body.

According to the third aspect of the present invention, there is provided a photographing system comprising a converter detachably mounted on a photographing lens, an electronic flash unit, first control means for controlling a light emission amount of the light-emitting portion on the basis of a preset guide number, second control means for metering light reflected by an object to be photographed through the photographing lens and controlling the light emission amount of the light-emitting portion o the basis of the metering result, detection means for detecting when the converter is mounted on the photographing lens, and selecting means for inhibiting the first control means from controlling the light emission amount of the light-emitting portion and causing the second control means to control the light emission amount of the light-emitting portion when the detection means detects that the converter is mounted on the photographing lens.

If the flash apparatus is used in a bounce state or an OFF-camera state, the light emission mode of the apparatus is forcibly switched to the light emission mode of the automatic control scheme suitable for each use state in accordance with an output from each state detection means arranged on the apparatus.

In addition, if the front or rear converter is mounted on the photographing lens, the light emission mode of the flash apparatus is forcibly switched to the light emission mode of the automatic control scheme suitable for the use state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a table showing ON conditions of an LED for AUTO CHECK;

FIG. 8 is a flow chart showing an emission light control routine of the LED for AUTO CHECK;

FIG. 9 is a table for selecting the light emission modes of the flash apparatus;

FIG. 11 is a table showing emission intervals and emission counts with respect to shutter speeds;

FIG. 13 is a table showing emission times with respect to light emission control values;

FIG. 14 is a table showing a relationship between each connecting terminal and a signal flow;

FIG. 15 is a view showing a state wherein the terminals of the camera and the flash apparatus are connected to each other;

FIG. 16 is a table showing a list of bits 1 to 8 of data transmitted from the flash apparatus to the camera;

FIG. 17 is a table showing a list of bits 9 to 12 of the data transmitted from the flash apparatus to the camera;

FIG. 18 is a table showing a list of bits 13 to 36 of the data transmitted from the flash apparatus to the camera;

FIG. 19 is a table showing the contents of bits 1 to 8 of the data transmitted from the flash apparatus to the camera;

FIG. 21 is a table showing a list of data transmitted from the camera to the flash apparatus;

FIG. 22 is a table showing the contents of the data transmitted from the camera to the flash apparatus;

FIG. 23 is a timing chart showing the flows of data which are also transmitted to other accessories when the flash apparatus is set in an OFF state;

FIG. 30 is a flow chart for explaining an operation of each component upon mounting of the converter.

DETAILED DESCRIPTION OF THE PREFERRED EMBODIMENTS

Figure 1:
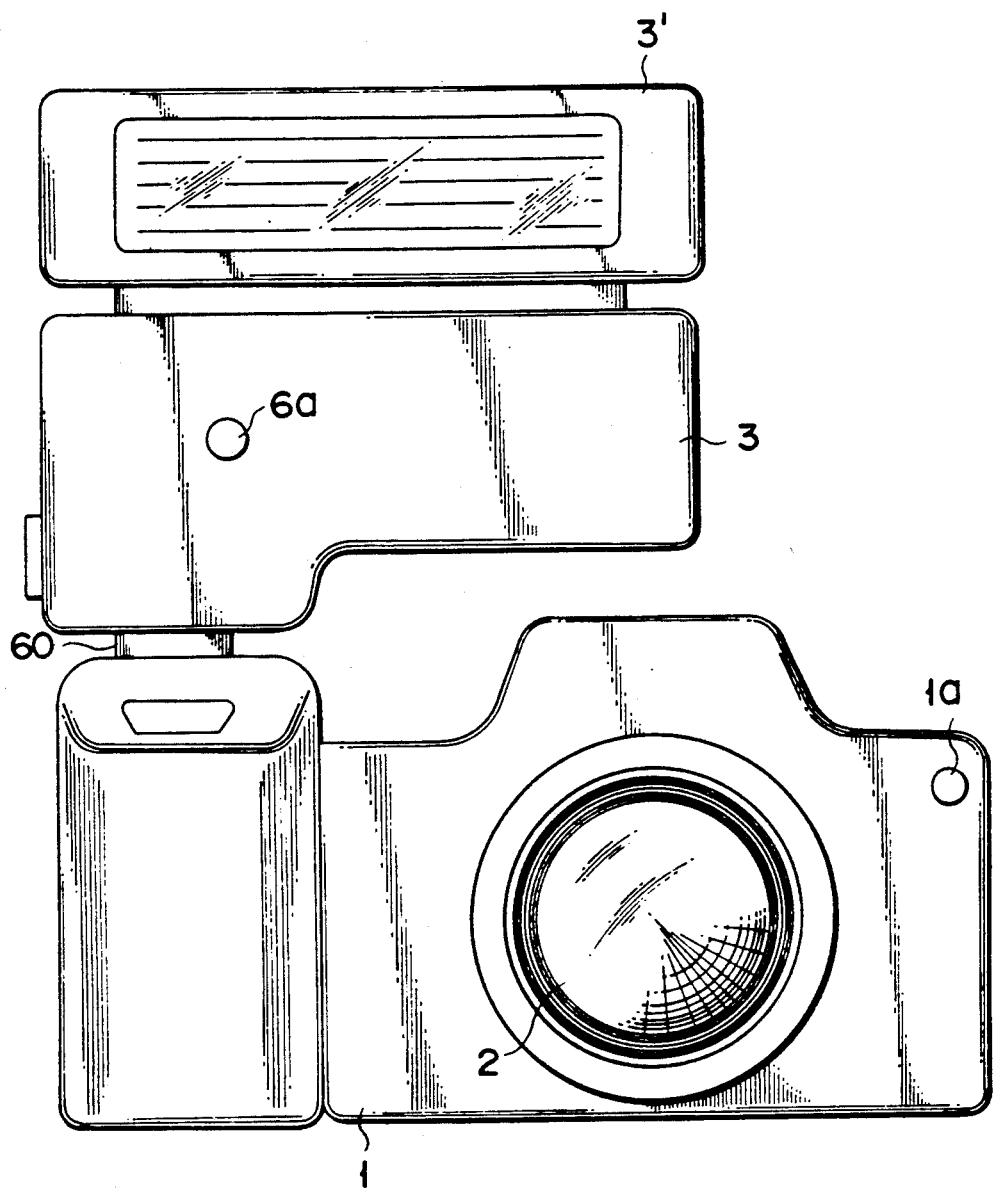
FIG. 1 is a front view showing an outer appearance of a state, viewed from the side of an object to be photographed, wherein a flash apparatus according to an embodiment of the present invention is coupled to a camera.

FIG. 1 shows a camera 1 on which a flash apparatus 3 according to an embodiment of the present invention is mounted. The camera is, for example, a single-lens reflex camera including a photographing lens 2 having a zoom optical system. The camera 1 incorporates an automatic exposure control unit (not shown) capable of selectively executing the following four types of automatic exposure control modes: a manual exposure control mode (Manu mode); a programmed automatic exposure mode (Prg mode); an aperture-priority automatic exposure control mode (Av mode); and a shutter-priority automatic exposure control mode (Tv). In this case, as is known, each exposure control mode is selected on the basis of an output from a metering element for receiving light reflected by an object to be photographed through a photographing lens and an operation of a mode switching member.

Figure 2:
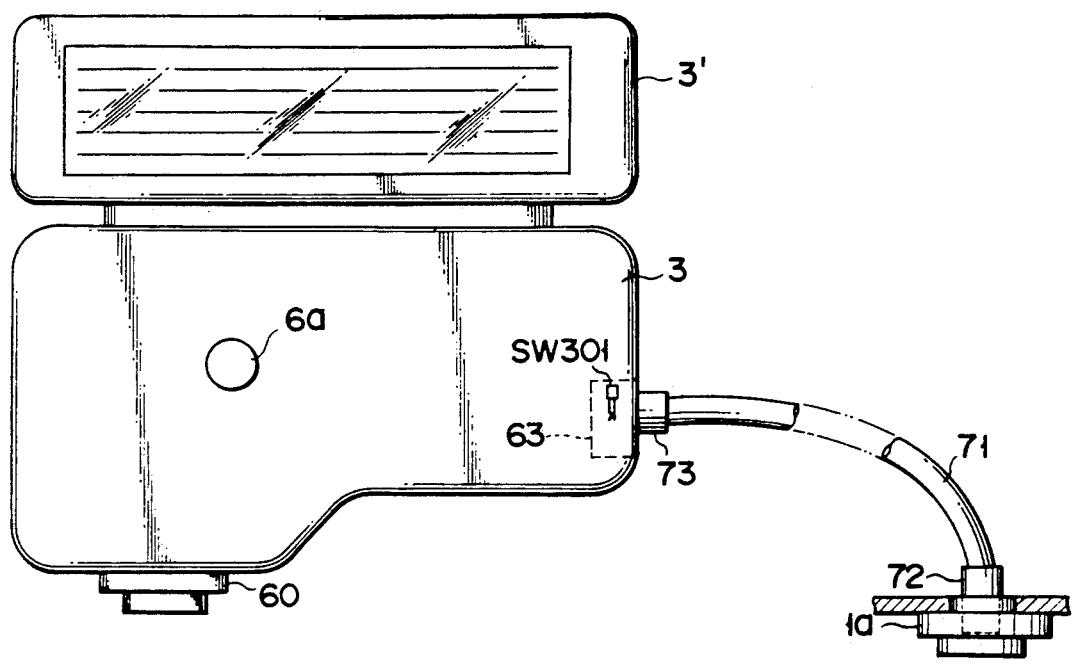
FIG. 2 is a front view showing a case wherein the flash apparatus is used while it is detached from the camera (OFF-camera state)

A connecting seat 1a is arranged on a proper portion of the camera 1. The connecting seat 1a is used for a photographing operation performed with the flash apparatus 3 being detached from the camera 1 (OFF-camera operation). A cord connecting portion 63 having a connector is arranged at a proper position of the flash apparatus 3, as shown in FIG. 2. The connecting seat 1a and the cord connecting portion 63 are connected to each other through an extension cord 71 having attaching plugs 72 and 73. When the attaching plugs 72 and 73 are respectively inserted in the connecting seat 1a of the camera 1 and the connector of the cord connecting portion 63 of the flash apparatus 3, the flash apparatus 3 is electrically connected to the camera 1.

The flash apparatus 3 includes a coupling means 60 (to be described in detail later) on the flash apparatus side, which is called an accessory foot. The apparatus 3 is detachably coupled to a camera-side coupling means (not shown) arranged on the upper surface of the camera 1, which is called an accessory shoe, through the coupling means 60.

A light-receiving portion 6a for receiving light emitted from the flash apparatus 3 and reflected by the object is arranged on a proper portion of the apparatus 3.

Figure 3A:
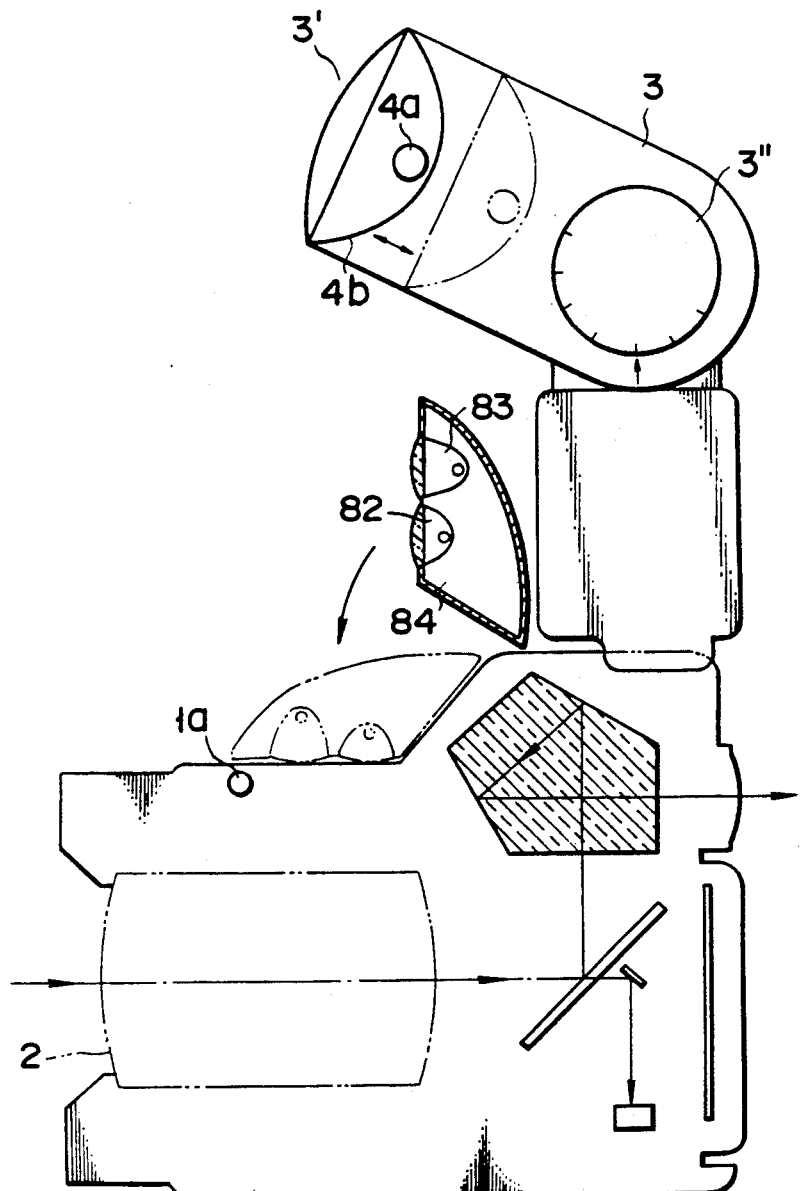
FIG. 3A is a side view showing a case wherein the flash apparatus is used in a bounce state.

A light-emitting portion 3' is provided on the upper portion of the flash apparatus 3. The light-emitting portion 3' is designed to switch illumination regions for a telephoto mode and a wide-angle mode. A selecting operation of the telephoto and wide-angle modes is performed by moving a flash tube 4a and a reflector 4b forward and backward in accordance with a signal based on the focal length of the photographing lens 2 and sent from the camera 1 side, as shown in FIG. 3A. In this case, if the focal length of the photographing lens 2 is 100 mm or more, the telephoto mode is selected. If it is less than 100 mm, the wide-angle mode is selected.

Figure 4:
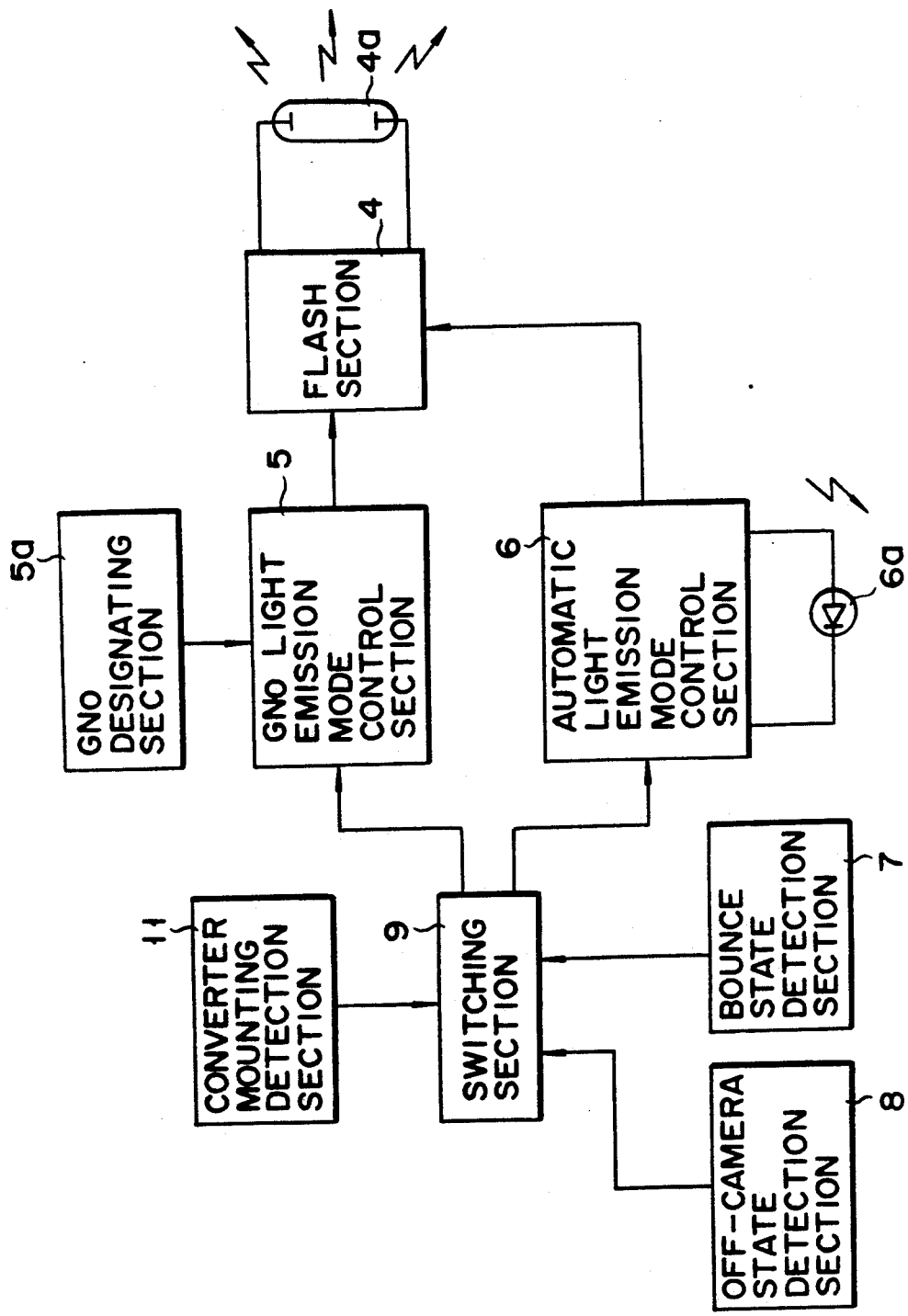
FIG. 4 is a block diagram showing a schematic arrangement of the flash apparatus.

As shown in FIG. 4, the flash apparatus 3 is designed such that a flash section 4 connected to the flash tube 4a constituted by a Xenon discharge tube is operated either by a GNo light emission mode control section 5 as a first light emission mode control section connected to a GNo designating section 5a or by an automatic light emission mode control section 6 as a second light emission mode control section connected to a light-receiving portion 6a. More specifically, the first light emission mode control section 5 controls the flash section 4 to emit light on the basis of a guide number preset by the GNo designating section 5a, and sets the flash apparatus 3 in an emission mode of an open control scheme. The second light emission mode control section 6 receives light emitted from the flash apparatus 3 and reflected by the object during a photographing operation through the light-receiving portion 6a, and controls the flash section 4 to stop light emission when the amount of received light reaches a predetermined amount, thus setting the flash apparatus 3 in a light emission mode of an automatic control scheme.

The light-receiving portion 6a is constituted by a proper automatic exposure (AE) sensor, and may be arranged on a proper portion of the camera 1 instead of arranging it on the flash apparatus 3 as shown in FIG. 1. When the light-receiving portion 6a is to be arranged on the camera 1, it can be arranged in accordance with the TTL scheme or the external light scheme in relation to the photographing lens 2.

As shown in FIG. 4, the flash apparatus 3 further includes a bounce state detection section 7, an OFF-camera state detection section 8, a converter mounting detection section 11, and a light emission mode forcibly switching section 9. The bound state detection section 7 detects whether the light emission axis of the light-emitting portion 3' of the flash apparatus 3 is inclined with respect to the optical axis of the photographing lens 2. The OFF-camera state detection section 8 detects whether the light-emitting portion 3' is detached from the camera 1, i.e., the flash apparatus 3 is used while it is detached from the camera 1. The converter mounting detection section 11 detects whether a converter (not shown) is mounted on the photographing lens 2.

The light emission mode forcibly switching section 9 is connected to the two light emission mode control sections 5 and 6, and normally sets the flash apparatus 3 in the light emission mode controlled by the first light emission mode control section 5. When detection signals are respectively output from the bounce state detection section 7 the OFF-camera state detection section 8, and the converter mounting detection section 11, the switching section 9 forcibly changes the normal light emission mode to the light emission mode controlled by the second light emission mode control section 6.

Figure 5:
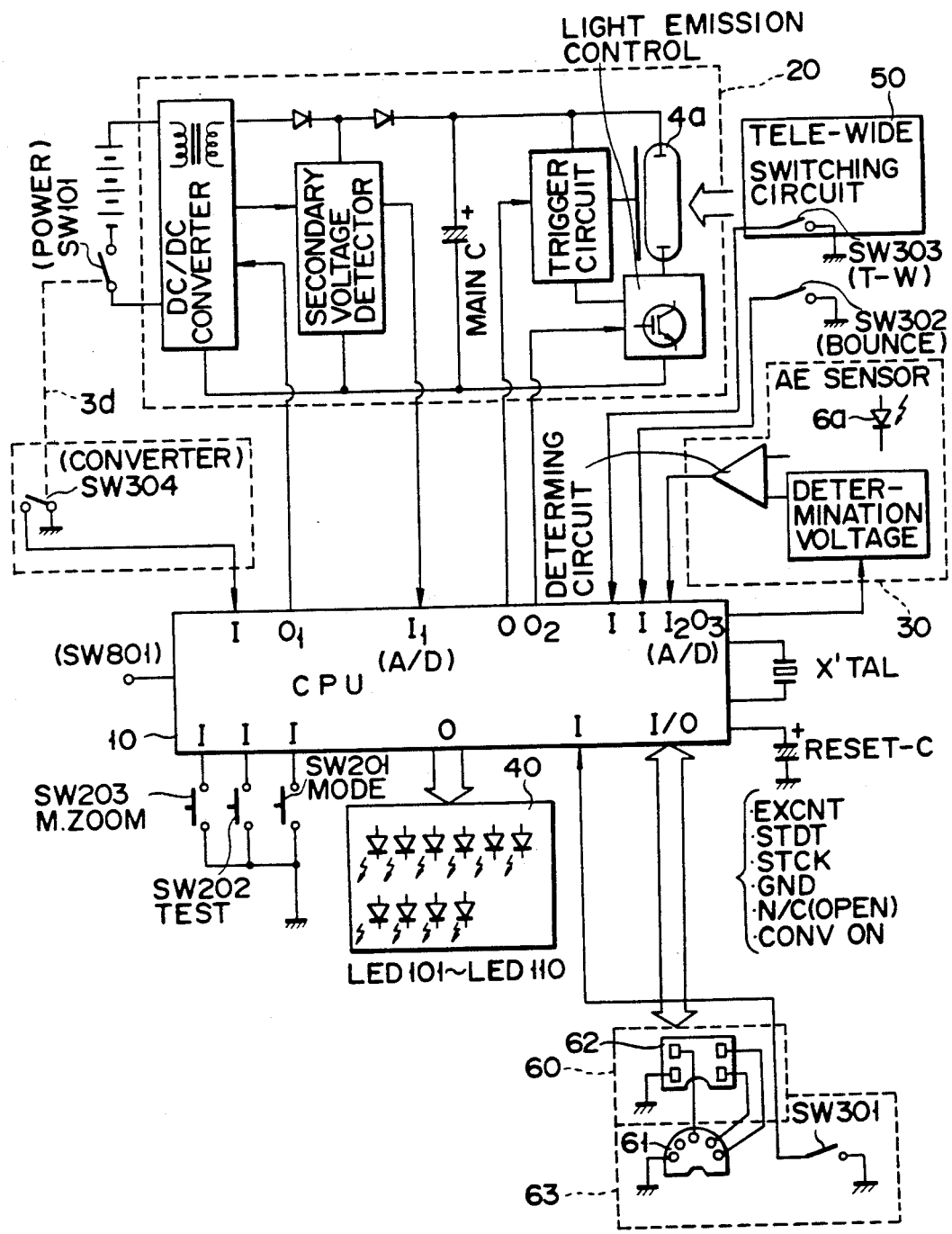
FIG. 5 is a schematic view showing an actual arrangement of the flash apparatus.

FIG. 5 shows an actual arrangement of the above-described flash apparatus 3. FIG. 5 shows a state wherein the flash apparatus 3 is coupled to the camera 1 and is operated in synchronism therewith, i.e., serves as a fully automatic flash apparatus of an external light scheme.

Referring to FIG. 5, a CPU 10 serves to control operations of the overall flash apparatus 3, and is constituted by, e.g., a one-chip microcomputer. The CPU 10 executes various control operations, e.g., communication (signal exchange) with the respective units, sections, and circuits arranged on the camera 1 side, emission control of the flash tube 4a, control of a charger, various types of display control, and read control of switch signals. The CPU 10 includes a crystal oscillator X'TAL for generating oscillation clocks required for control, and a reset capacitor RESET-C for performing power ON reset of the CPU 10.

The following components are connected to the CPU 10: a flash control circuit 20, a light emission amount determining circuit 30, a display circuit 40, an illumination region switching circuit 50, the coupling means 60 on the flash apparatus side, and the cord connecting portion 63.

The flash control circuit 20 performs charge control of the flash apparatus 3, and controls light emission from the start to the end of a light emitting operation. The flash control circuit 20 will be described in detail later.

When light emitted from the flash apparatus 3 and reflected by the object is received by the light-receiving portion 6a, the light emission amount determining circuit 30 determines a proper light emission amount on the basis of the amount of received light.

The display circuit 40 displays operation conditions of the flash apparatus 3. For example, the display circuit 40 includes 10 light-emitting diodes (LEDs). The functions of these ten LEDs will be described later.

The illumination region switching circuit (tele-wide switching circuit) 50 drives an actuator (not shown) for switching the illumination region of the light-emitting portion 3' between the telephoto and wide-angle modes.

The coupling means 60 serve to mechanically and electrically couple the camera 1 and the flash apparatus 3 to each other. The coupling means 60 incorporates a hot shoe 62. The cord connecting portion 63 has the connector 61, as described above. When the flash apparatus 3 is to be used while it is detached from the camera 1, the apparatus 3 is electrically connected to the connecting seat 1a of the camera 1 through the extension cord 71. This connecting state is electrically equivalent to the state wherein the apparatus 3 is connected to the camera 1 through the hot shoe 62 of the coupling means 60. The cord connecting portion 63 further includes a switch SW301. The switch SW301 is a detecting switch which is depressed and turned on by the attaching plug 73 when the plug 73 attached to one end of the extension cord 71 is inserted in the connector 61, as shown in FIG. 2.

Figure 6:
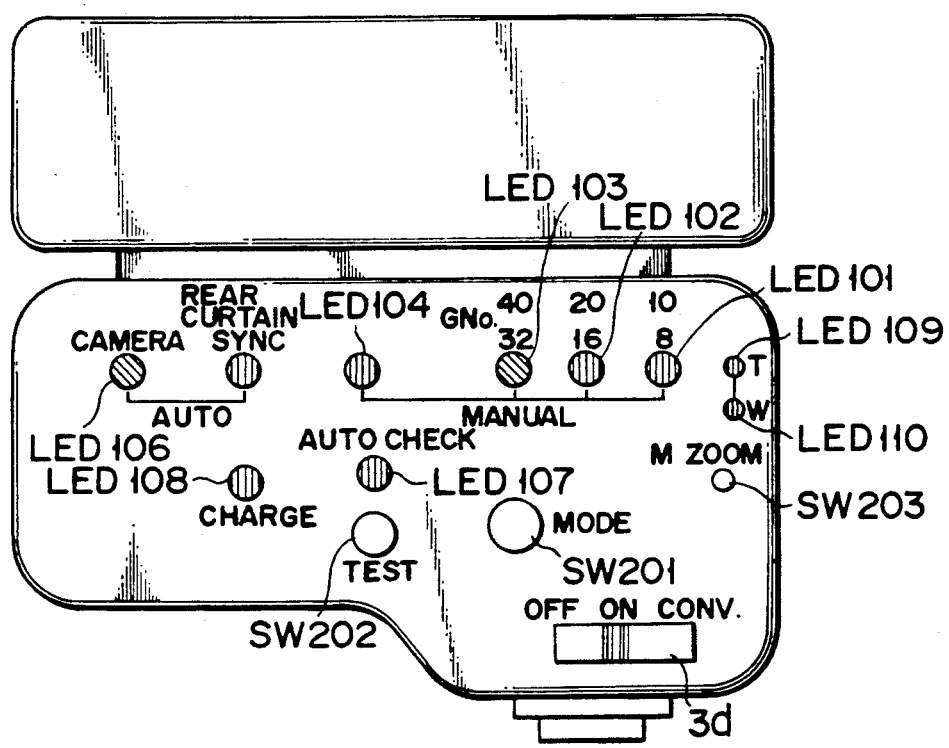
FIG. 6 is a rear view of the flash apparatus.

As shown in FIG. 6, a mode selection switch SW201 (MODE), a test flash switch SW202 (TEST), and a manual zoom switch SW203 (M ZOOM) are arranged on the rear surface of the flash apparatus in addition to the ten LEDs. Furthermore, a switching knob 3d having three positions "OFF", "ON", and "CONV." is arranged. As will be described later, a power switch SW101 and a converter mounting switch SW304 (FIG. 5) are operated in accordance with a switching operation of the switching knob 3d.

Of the ten LEDs, six LEDs 101 to 106 are arranged on an upper line; two LEDs 107 and 108, on a lower line; and two LEDs 109 and 110, at upper and lower positions on the right side of the two lines. Only the two LEDs 103 and 106 of the ten LEDs 101 to 110 emit green light. All the other LEDs emit red light. In this case, display of green light represents that the flash apparatus 3 is set in the normal mode (recommended mode).

Of the ten LEDs 101 to 110, the four LEDs 101 to 104 are turned on when the camera 1 is set in the manual exposure control mode by the mode selection switch SW201 (see FIG. 5), i.e., the flash apparatus 3 is to be used in a light emission amount fixing mode of the open control scheme. More specifically, of these LEDs, the three LEDs 101 to 103 are turned on to display guide numbers (GNo) for light emission. The LED 101 is used to display GNo 10 or 8; the LED 102, GNo 20 or 16; and the LED 103, GNo 40 or 32. The LED 104 is used to display whether the flash apparatus 3 is set in a multi-light-emission mode.

The remaining LEDs 105 and 106 on the upper line and the LEDs 107 on the lower line are turned on only when the camera 1 is set in the automatic exposure control mode. More specifically, the LED 105 (REAR CURTAIN SYNC) is turned on to indicate that an exposure control unit (not shown) of the camera 1 set in the automatic exposure control mode can be tuned to the flash apparatus 3 set in the automatic control scheme emission mode. The LED 106 (CAMERA) is turned on to indicate that the exposure control apparatus of the camera 1 is set in the automatic exposure control mode.

The LED 107 (AUTO CHECK) is used to check a light emitting state of the light-emitting portion 3'. When the light-emitting portion 3' properly emits light, the LED 107 is repeatedly turned on and off at a period of 350 msec for three seconds so as to inform a user that the light emission amount is enough. In contrast to this, when the light emission amount is not enough, the LED 107 is not turned on, thus informing the state to the user.

FIG. 7 shows a table of conditions of turning on the LED 107. The CPU 10 is operated in accordance with a flow chart in FIG. 8, which shows an automatic light emission amount check routine, so as to satisfy the conditions of the table. It is checked first whether the flash apparatus 3 is set in a light emission amount automatic changing mode, i.e., a mode for automatically changing a light emission amount in accordance with an object distance, or a light emission amount fixing mode, i.e., a mode for emitting light in a light emission amount selected by a user regardless of an object distance (step S1). This routine is continued only when the light emission amount automatic changing mode is set. If YES in step S1, it is then checked whether the apparatus 3 is set in the GNo control mode (the light emission mode based on the open control scheme) or the automatic control mode (the light emission mode based on the automatic control scheme) (step S2).

If the GNo control mode is set, the CPU 10 sets a designated GNo supplied from the camera 1 in a register GNo' (not shown) arranged inside or outside the CPU 10 (step S3). In addition, the CPU 10 sets an allowable GNo, which is estimated from a secondary voltage value input from a secondary voltage detector 21 (FIG. 5) of the flash control circuit 20, in a register GNo" (not shown) arranged inside or outside the CPU 10 (step S4). In this case, since the detection output from the secondary voltage detector 21 is an analog voltage value, the analog value must be converted into a digital value by an A/D converter (not shown) arranged inside the CPU 10.

When the values are respectively set in the registers GNo' and GNo", the CPU 10 compares these values with each other (step S5). The CPU 10 flickers the LED 107 only when the value set in the register GNo' is smaller than or equal to the value set in the register GNo" (step S6).

If it is determined in step S that the automatic control mode is set, the CPU 10 checks on the basis of an input from the light emission amount determining circuit 30 whether full light emission is performed, i.e., a light emission stop signal should be output (step S7). The CPU 10 flickers the LED 107 only when the light emission stop signal is output (step S6).

Referring to FIG. 6 again, the remaining LED 108 on the lower line of the rear surface of the flash apparatus 3 is used to display that charging of the apparatus 3 is completed.

The pair of the LEDs 109 and 110 for red display arranged on the upper and lower positions on the right end side of the rear surface of the flash apparatus 3 are used to display whether the light-emitting portion 3' is in the telephoto or wide-angle mode.

Referring to FIG. 5 again, the mode selection switch SW201 (the mode switch in FIG. 6) connected to the CPU 10 is used to select the light emission mode of the flash apparatus 3. The selection switch SW201 operates differently depending on whether the exposure control unit of the camera 1 is set in the manual exposure control mode or the automatic exposure control mode. More specifically, when the camera 1 is set in the manual exposure control mode, and the mode selection switch SW201 is depressed, ON states of the four LEDs 101 to 104 scroll in a cyclic order as follows:

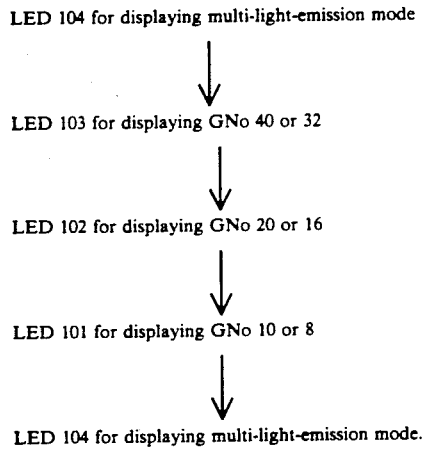

Therefore, if the mode selection switch SW201 is released when a desired LED of the LEDs 101 to 104 is turned on the flash apparatus 3 is set in the desired state.

When the mode selection switch SW201 is depressed while the camera 1 is set in the automatic exposure control mode, an ON state scrolls between the LED 105 for indicating that the camera 1 and the flash apparatus 3 are tuned to each other and the LED 106 for indicating that the camera 1 is set in the automatic exposure control mode. Therefore, if the mode selection switch SW201 is depressed while a desired one of the LEDs 105 and 106 is turned on, the flash apparatus 3 is set in the corresponding state.

The test flash switch SW202 (TEST switch in FIG. 6) connected to the CPU 10 is used to test a flashing operation. If the switch SW202 is depressed while the flash apparatus 3 is set in the light emission amount fixing light emission mode, the light-emitting portion 3' emits light in a designated one of the four light emission modes, i.e., the multi-light-emission mode, the GNo 40 (or 32) light emission mode, the GNo 20 (or 16) light emission mode, and the GNo 10 (or 8) light emission mode. If the switch SW202 is depressed while the flash apparatus 3 is set in the light emission amount automatic changing mode, the apparatus 3 emits light in the following manner. In GNo control, light emission is performed in accordance with a designated GNo from the camera. In automatic control, a light emission amount is automatically adjusted on the basis of an output from the AE sensor of the light-receiving portion 6.

The manual zoom switch SW203 (M ZOOM switch in FIG. 6) connected to the CPU 10 is used to manually select the telephoto mode or the wide-angle mode of the light-emitting portion 3'. In the embodiment shown in FIG. 5, whether to set the light-emitting portion 3' in the telephoto or wide-angle mode is automatically determined by a focal length signal sent from the camera 1. When the manual zoom switch WS203 is depressed, a mode automatically set on the basis of a focal length signal is forcibly changed to a different mode. This forcibly set mode of the light-emitting portion 3' is released to be switched back to the previous automatically set mode when the data for the automatic exposure control mode of the camera 1 is changed or the mode selection switch SW201 of the flash apparatus 3 is turned on.

In addition to the OFF-camera state detection switch SW301, the bounce state detection switch SW302 is connected to the CPU 10. The switch SW302 will be described later.

A position state detection switch SW303 is also connected to the CPU 10. The switch SW303 is used to generate a state signal representing whether the light-emitting portion 3' is set in the telephoto or wide-angle mode.

The power switch SW101, which is operated in accordance with the position of the switching knob 3d is used to start the CPU 10. The converter mounting switch SW304, which is also operated in accordance with the position of the switching knob 3d, is connected to the CPU 10. The switch SW304 is operated in synchronism with the power switch SW101. More specifically, the switch SW101 is closed when the switching knob 3d is switched to "ON" or "CONV.", whereas it is opened when the switching knob 3d is switched to "OFF". The switch SW304 is closed when the switching knob 3d is switched to "CONV.", whereas it is opened when the switching knob 3d is switched to "ON" or "OFF". That is, the position "CONV." of the switching knob 3d is a position to be forcibly set by a user when the converter is to be used.

A converter detection switch SW801 connected to the CPU 10 constitutes the converter mounting detection means 11. The switch SW801 will be described in detail later.

Flashing control of the flash apparatus 3 having the above-described arrangement will be described below in relation to the exposure control modes of the camera 1 with reference to a table shown in FIG. 9.

Flashing control of the camera 1 and the flash apparatus 3, which is designed as in FIG. 9, is roughly classified into the following two modes.

I. Light Emission Control Based on Open Control Scheme

This control includes a case wherein the flash apparatus 3 is flashed in accordance with a designated guide number from the camera 1 (GNo control), and a case wherein the apparatus 3 is flashed in accordance with a light emission amount set o the side of the apparatus 3 (manual control) or in the multi-light-emission mode. In the manual control, three light emission amount levels are prepared for the telephoto or the wide-angle mode. These levels can be selected by manually operate the mode selection switch SW201.

The item "camera power off/absence" in the table shown in FIG. 9 indicates that the power source on the camera 1 side is not turned on and the flash apparatus 3 is detached from the camera 1 (no signal communication between the apparatus 3 and the camera 1). In this case, a flashing operation based on a designated guide number (GNo control), a manual flashing operation, or a multi-light-emission operation is executed only by turning on the test flash switch SW202. Note that the multi-light-emission operation will be described in detail later.

II. Light Emission Control Based On Automatic Control Scheme

In this control, a light emission amount for flashing is determined by light flashed from the flash apparatus 3 and reflected by an object to be photographed. This control is automatically performed. More specifically, the reflected light is received by the light-receiving portion 6a of the flash apparatus 3 (or the camera 1), and the amount of received light is photoelectrically converted and integrated to generate, e.g., an object measurement voltage. Meanwhile, for example, an integration determination voltage (reference voltage) is generated on the basis of a combination of factors such as a film speed signal, an FNo signal, and the like sent from the camera 1. By comparing the integration determination voltage and the object measurement voltage, the end timing of a flashing operation is obtained, and a proper light emission amount is determined.

Figure 10:
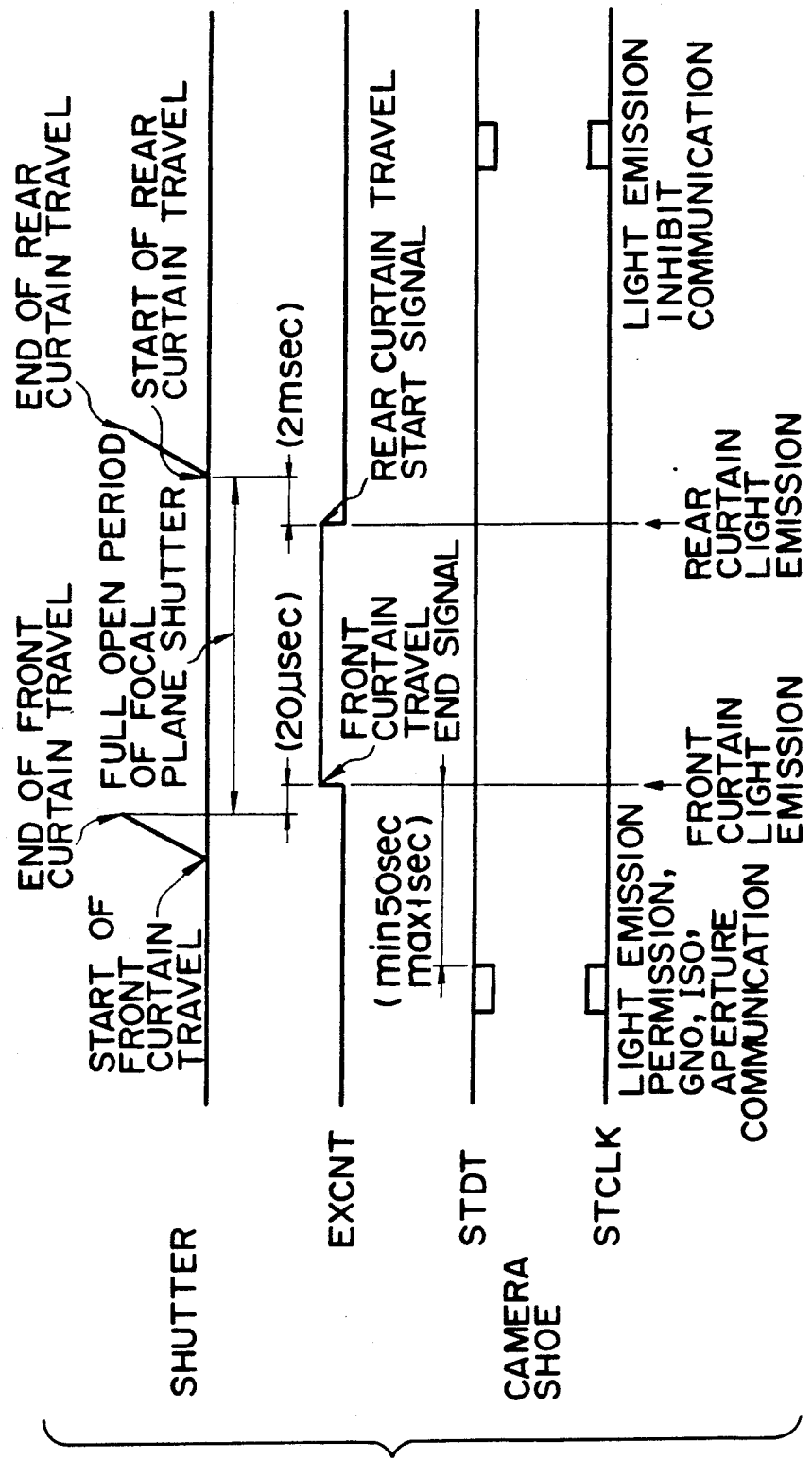
FIG. 10 is a timing chart for explaining a flash singal (a front curtain sync signal and a rear curtain sync signal)

A flash signal (front and rear curtain sync signals) sent from the camera 1 to the flash apparatus 3 will be described with reference to FIG. 10.

"Front curtain synchronization" in the table shown in FIG. 9 is a tuning mode utilizing a front curtain sync signal based on the leading edge of an EXCNT signal, and is called normal flash synchronization. More specifically, in this mode, a flashing operation is performed within a predetermined time, e.g., 100 μsec after the leading edge of the EXCNT signal which is set at "High" 20 μsec after reception of a signal from, e.g., a switch (not shown) which is turned on upon completion of a front curtain travel operation.

"Rear curtain synchronization" is a tuning mode utilizing a rear curtain sync signal based on the trailing edge of the EXCNT signal. More specifically, in this mode, a flashing operation is performed within a predetermined time, e.g., 100 μsec after the trailing edge of the EXCNT which indicates that 2 msec has elapsed after the start of a rear curtain travel operation.

Note that since this EXCNT signal is sensitive to noise, the flash apparatus 3 includes a circuit (not shown) for performing a chatter killer operation for several tens μsec after the EXCNT signal rises and falls in order to prevent an operation error due to noise. In addition, the EXCNT signal is neglected while the camera 1 is in a light emission inhibiting state.

The multi-light-emission mode will be described below. In this mode, two or more flashing operations are performed while the shutter is fully opened. This mode is used to perform rapid sequence photography for obtaining successive photographs of the same object to be photographed by using a flashing effect. For example, such photographs are used to analyze pitching forms in baseball, swings of clubs in golf, and swings of rackets in tennis.

In the embodiment shown in the accompanying drawings, with a light emission amount based on GNo 9, flashing operations can be performed a maximum of 20 times. With regard to the combination with a shutter speed, as indicated by a table in FIG. 11, the number of times of flashing operations can be set in accordance with a shutter speed set on the camera 1 side. The table shown in FIG. 11 is very useful for a user to estimate the number of times of flashing operations with respect to a shutter speed to be set in the multi-light-emission mode.

In the case shown in FIG. 11, even if the multi-light-emission mode is selected, only one flashing operation is performed while the shutter speed of the camera 1 is set to be 1/100 to 1/60 sec (equivalent to normal flash photography) due to a relationship with a curtain speed. If the shutter speed is set to be higher than 1/100, the free opened shutter curtain cannot be maintained, and no flashing operation is performed. That is, a multi-light-emission effect is obtained only at a shutter speed of 1/30 sec or lower.

The light emission timing of this multi-light-emission mode is set such that light emission is started at the leading edge of the EXCN signal and is stopped at the trailing edge of the EXCNT signal after a predetermined light emission interval or a predetermined number of times of light emission. In this case, a rear curtain travel operation is started 2 msec after the EXCNT signal is set at "L". Since a curtain closure error phenomenon may occur in this case, the EXCNT signal rises with priority over the predetermined number of times of light emission.

When the flash apparatus 3 is to be used while it is detached from the camera 1 (in an OFF-camera state), as shown in FIG. 2 and described with reference thereto, the attaching plug 73 on one end of the extension cord 1 is inserted in the connector 61 of the cord connecting portion 63, and the attaching plug 72 on the other end is inserted in the connecting seat 1a of the camera 1 so as to electrically connect the circuit in the flash apparatus 3 to the electric circuit in the camera 1. In this case, when the attaching plug 73 is inserted in the connector 61, the OFF-camera detection switch SW301 is turned on. With this operation, the OFF-camera detection signal is supplied to the CPU 10 of the flash apparatus 3 and a CPU (not shown) of the camera 1, and the multi-light emission mode is shifted to the light emission mode of the normal automatic control scheme.

FIG. 3A shows a case wherein the flash apparatus 3 is used in a bounce state. The camera 1 includes a built-in flash apparatus 84 having two special light emission tubes 82 and 83 for the telephoto and wide-angle modes in addition to the detachable flash apparatus 3. The built-in flash apparatus 84 is pivotally arranged on, e.g., the upper surface of the camera 1, and is set in a light emission enable state in an upright (pop-up) state.

Figure 3B:
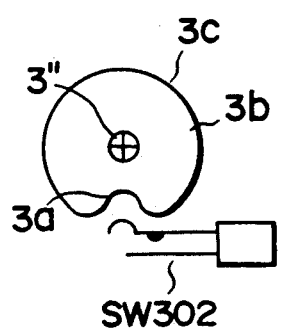
FIG. 3B is a view showing an arrangement of a bounce state detection switch.

The light-emitting portion 3' of the flash apparatus 3 can be freely moved between a position where the light emission axis is parallel to the photographing lens 2 and a position where it is inclined (e.g., inclined upward by 30°). This inclined state (bounce state) is detected by the bounce state detection switch SW302. More specifically, as shown in FIG. 3B, a cam plate 3b having a recess 3a is arranged in the flash apparatus 3 so as to be integral with a pivot shaft 3" of the light-emitting portion 3'. The detection switch SW302 is arranged at a stationary portion opposite to the cam plate 3b. While the light emission axis is parallel to the photographing lens 2, the recess 3a opposes the switch SW303 to set it in an OFF state. During a bounce state, however, a circumferential portion 3c of the cam plate 3b depresses the switch SW302 downward to set it in an ON state.

When the switch SW302 is turned on and a bounce state is detected, the external flash apparatus 3 is switched to the light emission mode of the normal automatic control scheme using the light-receiving portion 6a, which is arranged on the apparatus 3 itself.

When a catch light effect (light emission is performed in a direction parallel to the lens optical axis so as to intentionally cause the pupils of the eyes to shine) is to be obtained by causing the built-in flash apparatus 84 to also emit light in this bounce state, light emission control is preferably performed to set the light emission amount of the built-in flash apparatus 84 to be smaller than that of the external flash apparatus 3 by 2 to 3 ev.

Figure 12:
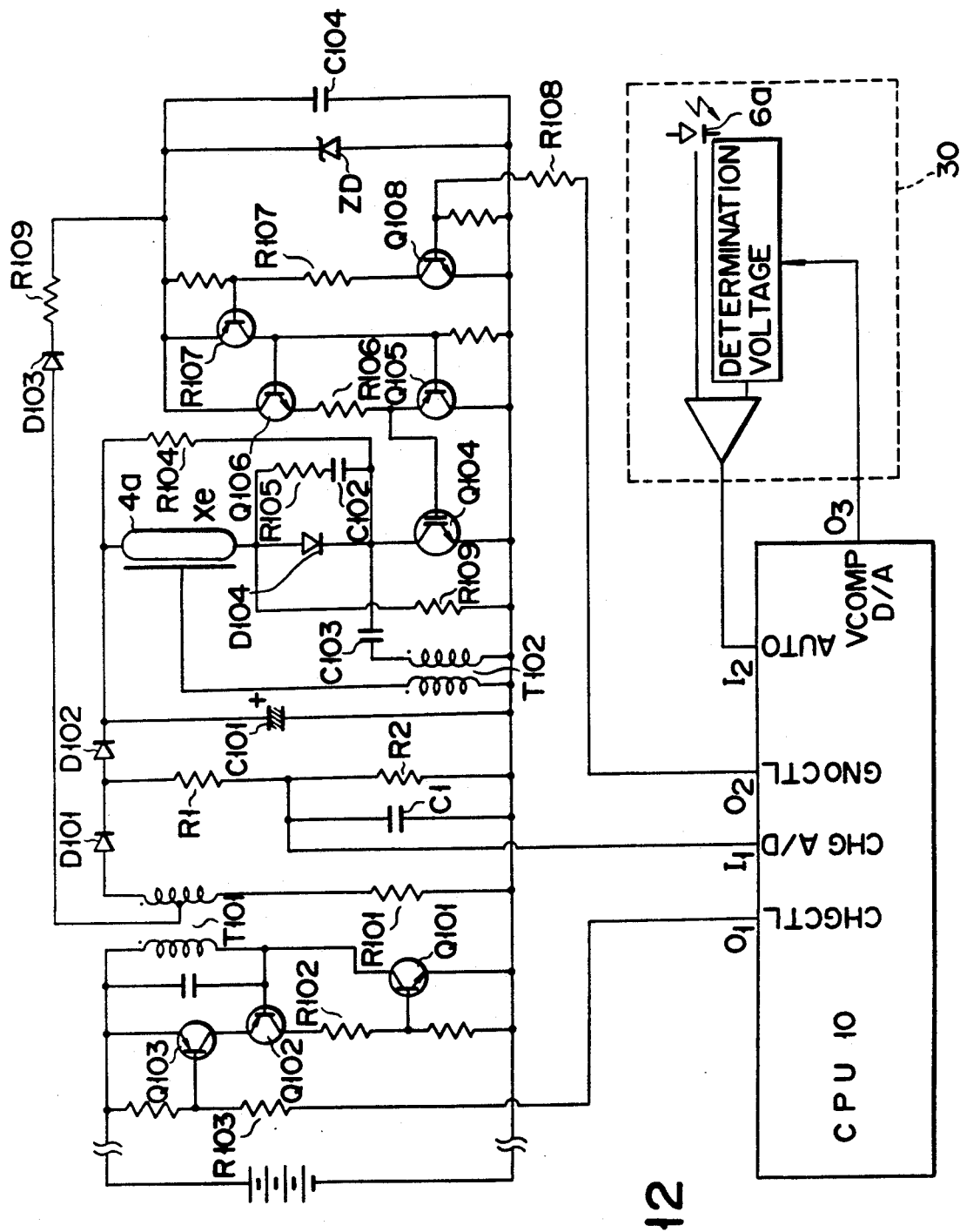
FIG. 12 is a circuit diagram showing an arrangement of an electrical circuit in the flash apparatus.

An operation of a flash circuit in the light emission modes of the open control scheme and the automatic control scheme will be described below with reference to FIG. 12. A capacitor C101 is a main capacitor C (FIG. 5) for causing the flash tube 4a arranged in the light-emitting portion 3' to emit light. A trigger circuit in the flash control circuit 20 (FIG. 5) is constituted by a trigger transformer T102, a capacitor C103, a resistor R109, and a field-effect transistor (FET) Q104. In this case, the transistor Q104 is an IGBT (Insulated Gate Bipolar Transistor) which can instantly control a large current depending on whether a gate voltage is set at "H" or "L".

A voltage doubling circuit for doubling a voltage between the two ends of the main capacitor C101 in a light emission operation is constituted by the IGBT Q104, three resistors R104, R105, and R109, a capacitor C102, and a diode D104. By applying the double voltage, which is obtained by doubling the voltage between the two ends of the main capacitor C101, to the anode (A)-cathode (k) path of the flash tube 4a, the light emission start voltage of the flash tube 4a can be reduced.

In addition, four transistors Q105 to Q108 constitute a circuit for controlling the gate of the IGBT Q104 in response to a light emission signal from a GNo. CTL terminal 02 of the CPU 10. Furthermore, a diode D103, a Zener diode Zb, the resistor R109, and a capacitor C104 constitute a power source circuit for generating a gate voltage of the IGBT Q104.

In the flash circuit having the above-describe arrangement, when the power switch SW101 (FIG. 5) is turned on, a CHGCTL signal terminal $O_1$ of the CPU 10 is changed from "H" to "L", and a PNP transistor Q103 is then turned on. As is known, an oscillating operation is then performed to start charging the main capacitor C101. In this case, the capacitor C103 is charged through the resistor R104 to have the same voltage as that of the main capacitor C101. In addition, the capacitor C102 is also charged through the resistors R104, R105, and R109 so as to have the same voltage as that of the main capacitor C101.

Resistors R1 and R2 divide substantially the same voltage as that of the main capacitor C101 and input the divided voltage to a CHG A/D terminal $I_I$ of the CPU 10.

Since no signal is generated from the GNo. CTL terminal $O_2$ of the CPU 10, i.e., no signal is generated from a resistor R108 for controlling the gate of the IGBT Q104, all the transistors Q108, Q107, and Q106 are turned off to maintain a state wherein the gate of the IGBT Q104 is not biased.

If a light emission signal is generated from the GNo. CTL terminal $O_2$ of the CPU 10, the respective transistors Q108, Q107, and Q106 are turned on, and the transistor Q105 is turned off. With this operation, the gate of the IGBT Q104 is biased and set at "H" through the resistor R106 and is shifted to an ON state. When this IGBT Q104 is shifted to the ON state, the charge of the capacitor C103 is discharged to the primary side of the trigger transformer T102 through the IGBT Q104. As a result, a high voltage is generated at the secondary side of the transformer T102, and is applied to the trigger electrode of the flash tube 4a. When the flash tube 4a is ionized, the cathode voltage of the flash tube 4a is decreased to "$-V_{C101}$". As a result, a voltage of "$2V_{C101}$" is applied to the anode (A)-cathode (K) path of the flash tube 4a, thus facilitating light emission of the flash tube 4a. With this operation, the charge of the main capacitor C101 is discharged through the capacitor C101→the flash tube 4a→the diode D104→the capacitor C101, so as to cause the flash tube 4a to emit light.

If the light emission signal disappears from the GNo. CTL terminal $O_2$ of the CPU 10, the respective transistors Q108, Q107, and Q106 are turned off, and the transistor Q105 is simultaneously turned on. With this operation, the gate of the IGBT Q104 is short-circuited by the transistor Q105 and is set in an OFF state. As a result, the capacitor C103 is instantly charged through the flash tube 4a, and light emission of the flash tube 4a is simultaneously stopped. That is, the next light emission is prepared at substantially the same time as the light emission of the flash tube 4a is stopped.

As described above, in this flash circuit, the IGBT Q104 has the three functions, i.e., serves as the light emission trigger circuit, the voltage doubling circuit, and the light emission main switch element. In this circuit, therefore, light emission of the flash tube 4a can be controlled with a timing precision of $\mu$sec by a light emission signal from the GNo. CTL terminal $O_2$ of the CPU 10.

In addition, according to the functions of this circuit, when the light emission mode based on GNo control is set, light emission can be performed with a desired GNo by stopping light emission of the flash tube 4a within a time calculated in accordance with the table in the CPU 10 by using an object distance, a preset aperture value, and the like.

In the light emission mode of the automatic control scheme, a determination voltage output is supplied from a $V_{COMP}$ D/A terminal $O_3$ of the CPU 10 to the light emission amount determining circuit 30 on the basis of film speed data and aperture data from the camera 1. In the light emission amount determining circuit 30, this determination voltage output is compared with the integral value of light flashed from the flash apparatus 3 and reflected by the object, which is incident on the light-receiving portion (AE sensor) 6a of the second light emission mode control means 6. This comparison result is input to an AUTO terminal $I_2$ of the CPU 10 and is output from the GNo. CTL terminal $O_2$. As a result, the flash apparatus 3 can automatically obtain a proper light emission amount.

Note that part of the above circuit is describh in detail in Published Unexamined Japanese Patent Application No. 63-311619 (U.S. Pat. application Ser. No. 07/446,400) filed by the present applicant.

A method of obtaining a light emission control time in GNo control will be described below.

In this case, a light emission control value $GN_H$ is obtained by the following equation:

$$GN_H = \{\log_2(GN)\} \times 8 + \Delta GN_1 + \Delta GN_2 \quad (6)$$

where

GN : GNo (distance × aperture) with which light emission is desired to be performed when ISO = 100

$\Delta GN_1$: amount to be corrected by charged voltage when light emission charged voltage is higher than light emission allowable level and is lower than full charged voltage $\Delta GN_2$: variation amount of full light emission GNo of each flash apparatus (stored in EEPROM (not shown))

For example, a table shown in FIG. 13 is stored in the CPU 10 in advance. Therefore, a light emission time can be obtained on the basis of the light emission control value $GN_H$ obtained according to equation (6) by referring to this table. The flash tube 4a is caused to emit light by sending a pulse having a duration corresponding to the obtained light emission time to the IGBT Q104. Note that light emission times shown in the table in FIG. 13 are determined on the basis of the actually measured values of the light emission characteristics and control circuit characteristics.

When the light emission control value $GN_H$ is higher than the full light emission level, a full light emission control value is used in place of the above value. For example, if the maximum light emission GNo of the flash apparatus is 40, and the calculated light emission control value $GN_H$ corresponds to GNo 50, light emission is performed with GNo 40. If the light emission control value $GN_H$ is lower than the minimum controllable light emission level, a minimum light emission control value is used. For example, if the minimum light emission GNo of the flash apparatus is 4, and the calculated light emission control value $GN_H$ corresponds to GNo 1, light emission is performed with GNo 4.

A communication method between the camera 1 and the flash apparatus 3 will be described below.

As described above, the camera 1 and the flash apparatus 3 are connected to each other by the following two connecting methods: the method of electrically and mechanically connecting them through the hot shoe 62 of the coupling means 60 on the flash apparatus side, and the method of electrically connecting them by using the extension cord 71 and the attaching plugs 72 and 73. In either method, four terminals shown in FIG. 14 are used for electrical connection, and the camera 1 and the flash apparatus 3 are connected to each other as shown in FIG. 15 through the respective terminals.

As part of a description of a communication format, a list of data to be transmitted from the flash apparatus 3 to the camera 1, the contents of the data, and the flow of the data will be described below.

Tables shown in FIGS. 16 to 18 show the light emission modes of the flash apparatus 3 and a list of data to be transmitted from the apparatus 3 to the camera 1. Note that the data of the table shown in FIG. 18 are transmitted to the camera 1 only when light emission permission is provided.

The table shown in FIG. 19 shows the contents of the data to be transmitted from the flash apparatus 3 to the camera 1 as follows:

bit 1: This represents whether the external flash apparatus is mounted, and is set at "1" when the external electronic flash apparatus is not mounted or the power source is turned off.

bit 2: This represents the charge level of the external flash apparatus. A light emission enable level is set with reference to a full charge level of "−0.5 ev".

bit 3: This is used to determine the tuning mode of the external flash apparatus and is used on the camera 1 side.

bit 4: This is used to transmit data representing whether the light emission mode of the external flash apparatus is based on GNo control or automatic control.

bit 5: This is used to confirm the presence/absence of proper light emission. Proper light emission is determined when light emission is performed in accordance with a GNo sent from the camera 1 in the GNo control scheme, and is determined when automatic adjustment of a light emission amount is performed in the automatic control scheme. In either case, signal transmission is executed immediately after light emission.

bits 6 to 8: They represent the maximum GNo of the external flash apparatus, e.g., GNo 38 in the telephoto mode, and GNo 32 in the wide-angle mode.

Figure 20:
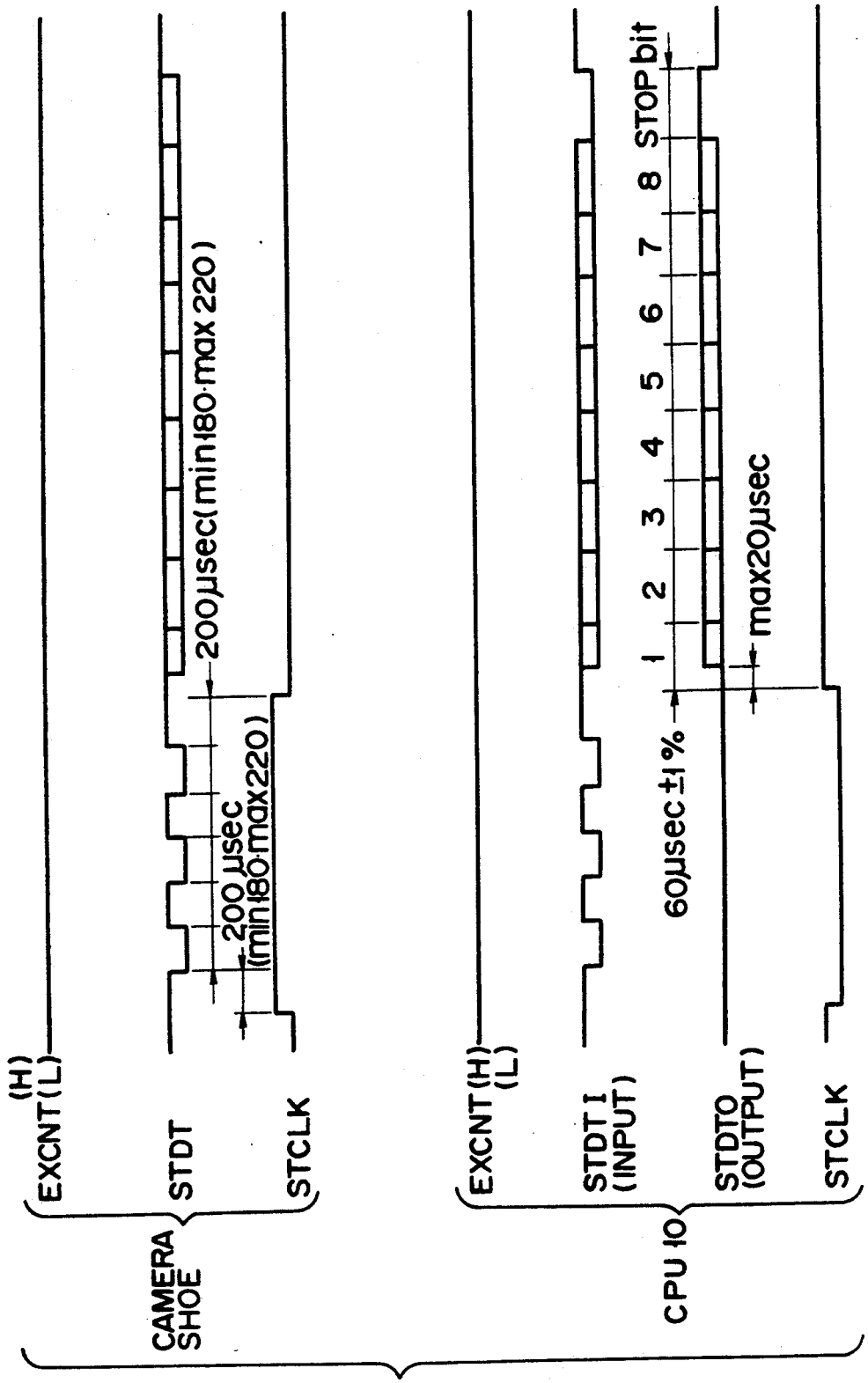
FIG. 20 is a timing chart showing the flows of data from the flash apparatus to the camera.

FIG. 20 shows a timing chart showing the flow of data from the flash apparatus 3 to the camera 1. Data transmission from the flash apparatus 3 to the camera 1 is non-synchronously performed. The end of transmission is confirmed by a STOP bit. If no confirmation is obtained, data transmission is performed from the start. If transmission data is added in future, the data is transmitted after the STOP bit in units of 8 bits. In this case, the STOP bit is used as a START bit to reestablish synchronization.

Tables shown in FIGS. 21 and 22 show a list of data to be transmitted from the camera 1 to the flash apparatus 3 in accordance with a camera operation and the contents of the data. Note that bit 13 and the subsequent bits in the table shown in FIG. 21 are data to be transmitted from the camera 1 only when a flashing operation is permitted.

Of the data shown in the table in FIG. 21, which are transmitted from the camera 1 to the flash apparatus 3, some data are also transmitted to other accessories. Therefore, even while the flash apparatus 3 is in an OFF state, these data appear as shown in FIG. 23. However, the flash apparatus 3 is designed not to respond to such data so as not to generate any response data including acknowledgement data.

Figure 24:
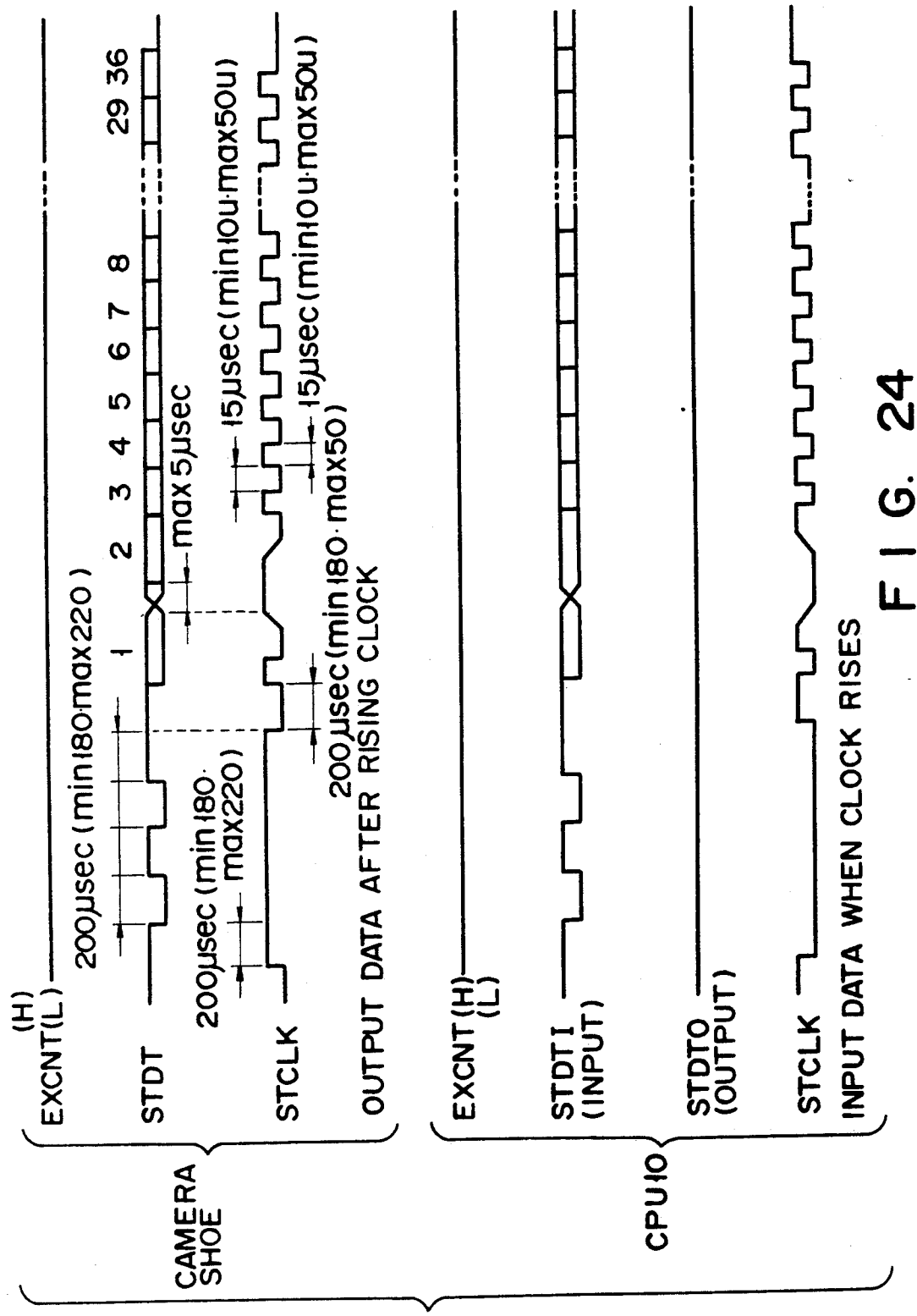
FIG. 24 is a timing chart showing the flows of data from the camera to the flash apparatus.

FIG. 24 is a timing chart for explaining the flow of data to be transmitted from the camera 1 to the flash apparatus 3.

An operation of the embodiment having the above-described arrangement will be described below with reference to flow charts shown in FIGS. 25 to 28.

Figure 25:
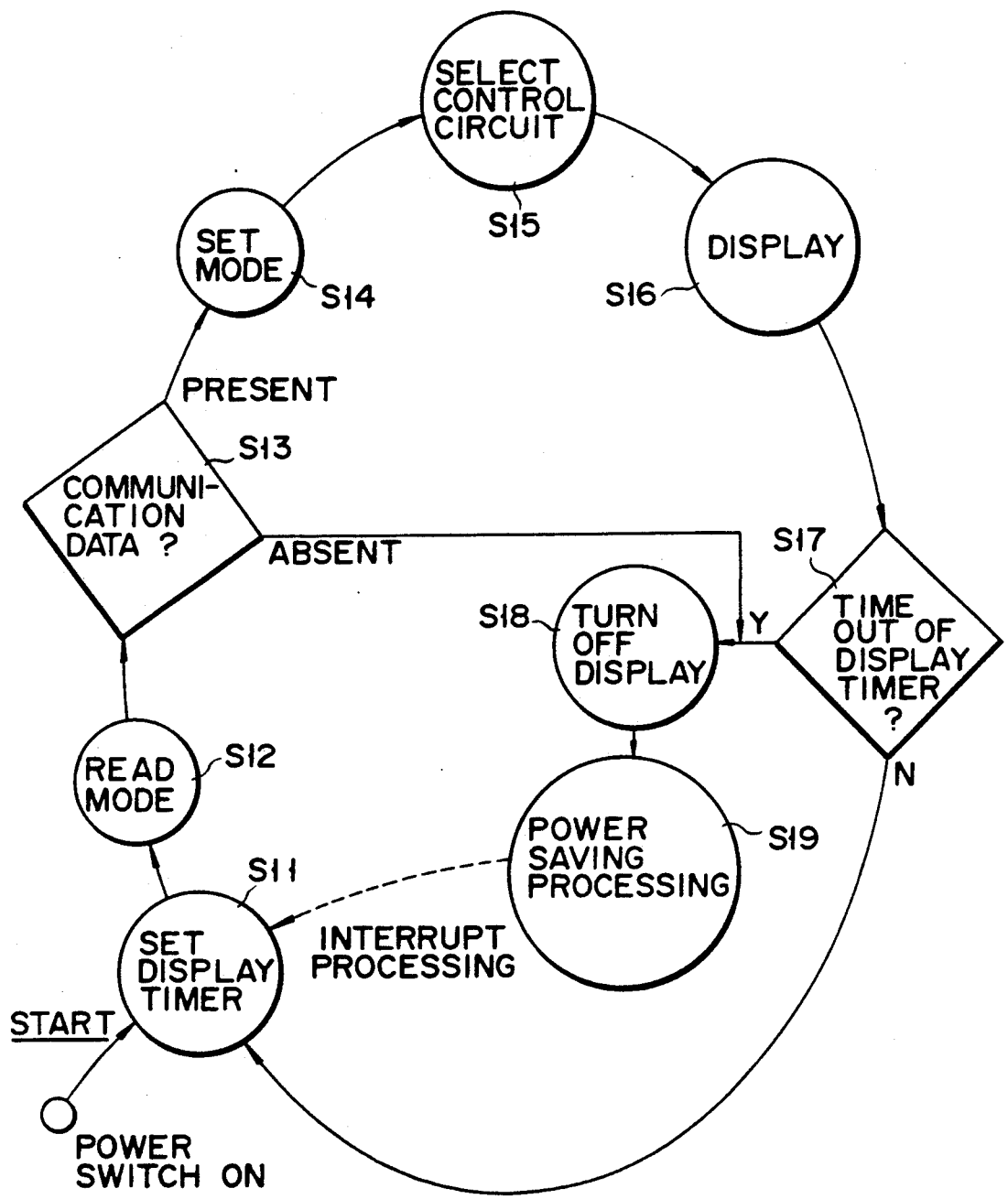
FIG. 25 is a general flow chart for explaining an overall operation of a flash control CPU incorporated in the flash apparatus of the present invention.

FIG. 25 is a general flow chart for explaining an overall operation of the CPU 10 of the flash apparatus 3 of the present invention. When the power switch SW101 (FIGS. 5 and 6) is closed to supply power to the flash apparatus 3, a routine "START" for setting a display timer is executed to set the display timer (step S11). In accordance with communication data to be transmitted from the camera 1 to the flash apparatus 3, such as shown in the tables in FIGS. 21 and 22, a camera mode defined by bits 4 and 5 of the data is read to determine one of the following modes: "programmed automatic exposure control mode (Prg mode)", "aperture-priority automatic exposure control mode (Tv mode)", and "manual exposure control mode (Manu mode)" (step S12). It is then checked whether the data of bit 13 and the subsequent bits of the communication data (see the table in FIG. 21) are transmitted from the camera 1 (step S13). This step is required to discriminate data transmitted from the camera 1 to the apparatus 3 from data transmitted from the camera 1 to other camera accessories. If no data of bit 13 and the subsequent bits are transmitted, the display unit is turned off (step S18), and power saving processing is performed (step S19). If the data of bit 13 and the subsequent bits are transmitted from the camera 1, bits 13 to 36 of the communication data are read, and the light emission mode of the external flash apparatus corresponding to the camera mode decoded in step S12 is set in accordance with the table shown in FIG. 9 (step S14).

A selection routine is executed to select a control circuit corresponding to the light emission mode of the external flash apparatus set in step S14 (step S15). This selection routine is important for the present invention and hence will be described in more detail below with reference to FIG. 26. The ON/OFF state of the OFF-camera detection switch SW301 is checked first (step S21). If it is ON, it means that an OFF-camera state is set in which the external flash apparatus 3 is used while it is detached from the camera 1, as described above. Therefore, the flow advances to a subroutine for "light emission control of automatic control scheme", and this processing is performed (step S22). That is, the second control means 6 is selected. If it is determined that the OFF-camera detection switch SW301 is turned off, it is then checked whether the bounce state detection switch SW302 for detecting the bounce state of the external flash apparatus 3 is turned on or off (step S23). If it is turned on, since the external flash apparatus 3 is in a bounce state, the flow advances to the subroutine for "light emission control of automatic control scheme" in step S22. If it is determined that the bounce state detection switch SW202 is turned off, the ON/OFF state of the converter mounting switch SW304 is checked (step S24). If it is ON, it means that the converter is mounted on the photographing lens 2. Therefore, the flow advances to the subroutine for "light emission control of automatic control scheme" in step S22. If it is determined that the converter mounting switch SW304 is OFF, the flow advances to a subroutine for "light emission control of open control scheme", and this processing is performed (step S25). That is, the first control means 5 is selected.

In other words, in the "control circuit selection" routine in step S15 for determining the light emission mode of the external flash apparatus 3, "light emission control of open control scheme" for determining a required light emission amount for a flashing operation on the basis of an object distance and an aperture value is performed (step S24) only when the external flash apparatus 3 is mounted on the camera 1, a bounce state is not set, and the converter is not mounted. The above light emission control is automatically switched to "light emission control of automatic control scheme" (step S22) on the program, in which light flashed from the apparatus 3 and reflected by an object to be photographed is received by the sensor, and a flashing operation is stopped as soon as correct exposure is achieved, if one of the following states is determined: an OFF-camera state wherein the external flash apparatus 3 is used while it is detached from the camera 1; a state wherein the apparatus 3 is mounted on the camera 1 and is set in a bounce state; and a state wherein the apparatus 3 is mounted on the camera 1 and is not in a bounce state, but the converter is mounted. With this control, correct exposure can always be ensured regardless of the use state of the external flash apparatus 3. The above description is associated with a characteristic feature of the present invention. If the light emission mode is controlled in steps S22 and S25, the flow returns to step S16 next to step S15 in FIG. 25.

Referring to FIG. 25 again, in step S16, a display operation is performed by means of the display member described with reference to FIG. 6. Subsequently, it is checked whether the time interval which was set for the display timer in step S11 has elapsed (step S17). If NO in step S17, the flow returns to step S11 to repeatedly execute the above-described loop. If YES in step S17, the display operation by means of the display member described with reference to FIG. 6 is stopped (step S18), and power saving processing is performed to prevent consumption of the power source battery (step S19).

Figure 27:
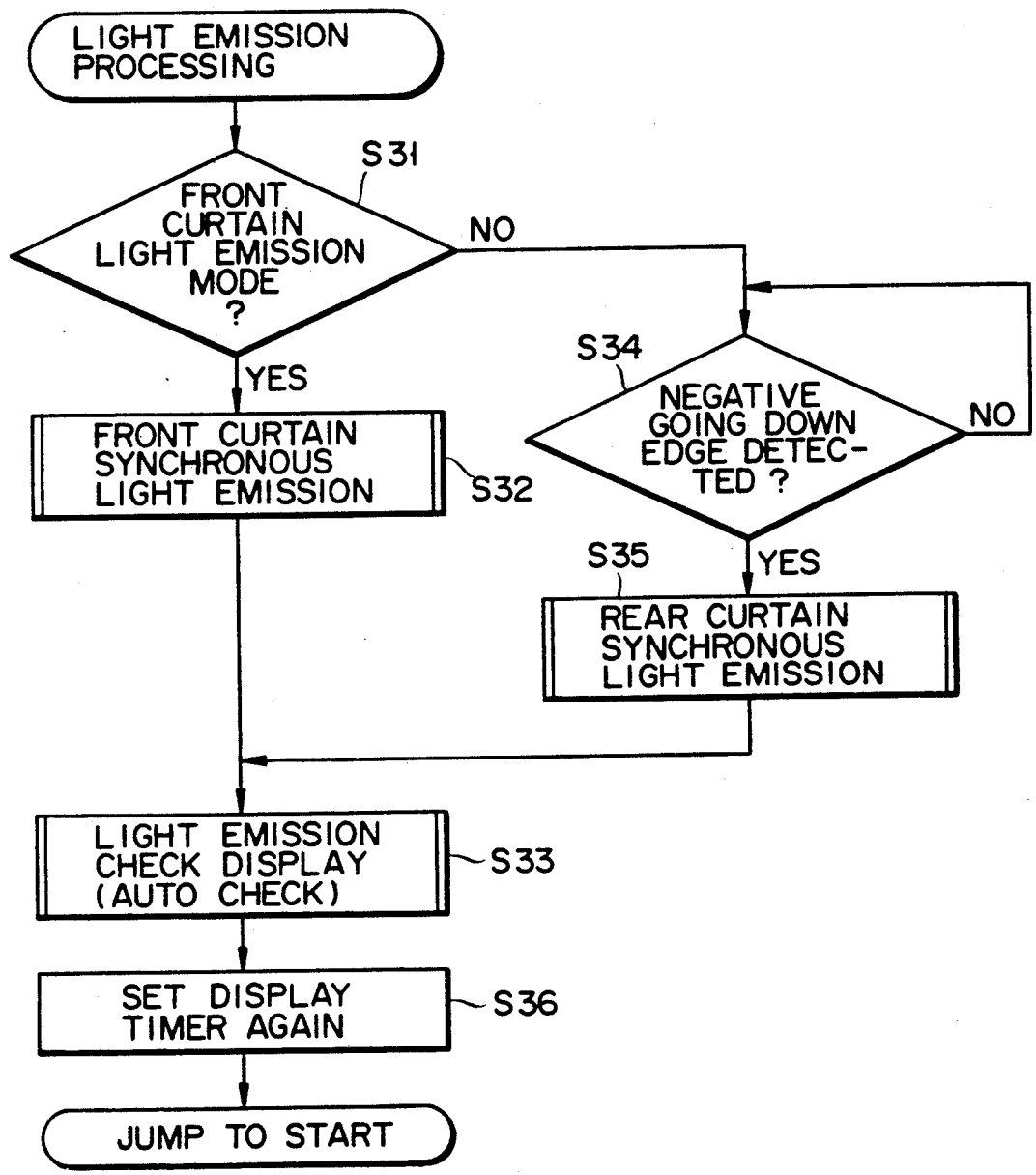
FIG. 27 is a flow chart showing light emission processing when an interrupt occurs in the flow chart in FIG. 25.
Figure 28:
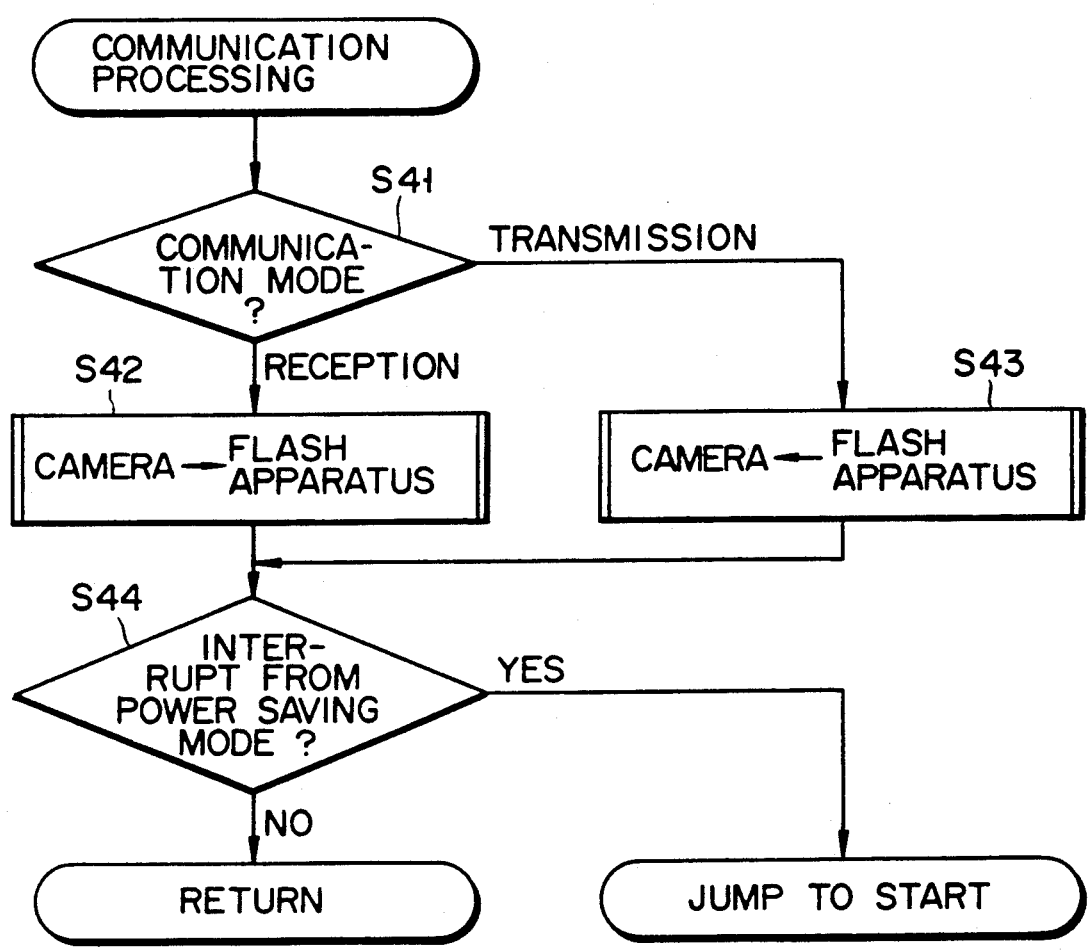
FIG. 28 is a flow chart showing communication processing when an interrupt occurs in the flow chart in FIG. 25.

FIGS. 27 and 28 are flow charts respectively showing a light emission processing subroutine and a communication processing subroutine which are performed when an interrupt occurs during processing in any step of the general flow chart shown in FIG. 25. The light emission processing subroutine shown in FIG. 17, which is performed upon occurrence of an interrupt, is arERWS at the positive going edge of the EXCNT signal, at which the signal goes from "L" to "H", and it is checked first whether "front curtain light emission mode" is set (step S31). If YES in step S31, a subroutine for "front curtain synchronous light emission" is executed (step S32), and the flow then advances to step 33 to perform the subroutine for "AUTO CHECK", which was previously described with reference to FIG. 8. If NO in step S31, a standby state is set until the EXCNT signal goes from "H" to "L" (step S34). When the negative going edge of the EXCNT signal is detected, a subroutine for "rear curtain synchronous light emission" is executed (step S35). The flow then advances to step S33 to execute the subroutine for "AUTO CHECK". Thereafter, the display timer is set again (step S36), and the flow jumps to the routine "START" in step S11 of the general flow chart shown in FIG. 25, thus executing the general flow chart again.

The communication processing subroutine shown in FIG. 28, which is performed upon occurrence of an interrupt, is started at the negative going edge of a data signal STDT, at which the signal goes from "H" to "L", and a communication mode is checked first (step S41). If the reception mode is set, a subroutine associated with communication of "camera→flash apparatus" is executed (step S42). If the transmission mode is set, a subroutine associated with communication of "flash apparatus→camera" is executed (step S43). After these subroutines are executed, it is checked whether an interrupt occurs from the power saving mode (step S44). If YES in step S44, the flow jumps to step S11 of the general flow chart shown in FIG. 25. If NO in step S44, the flow returns to the step next to the routine in FIG. 25 which is performed upon occurrence of an interrupt. The above description is associated with outlines of the light emission processing and the communication processing upon occurrence of an interrupt.

Figure 29:
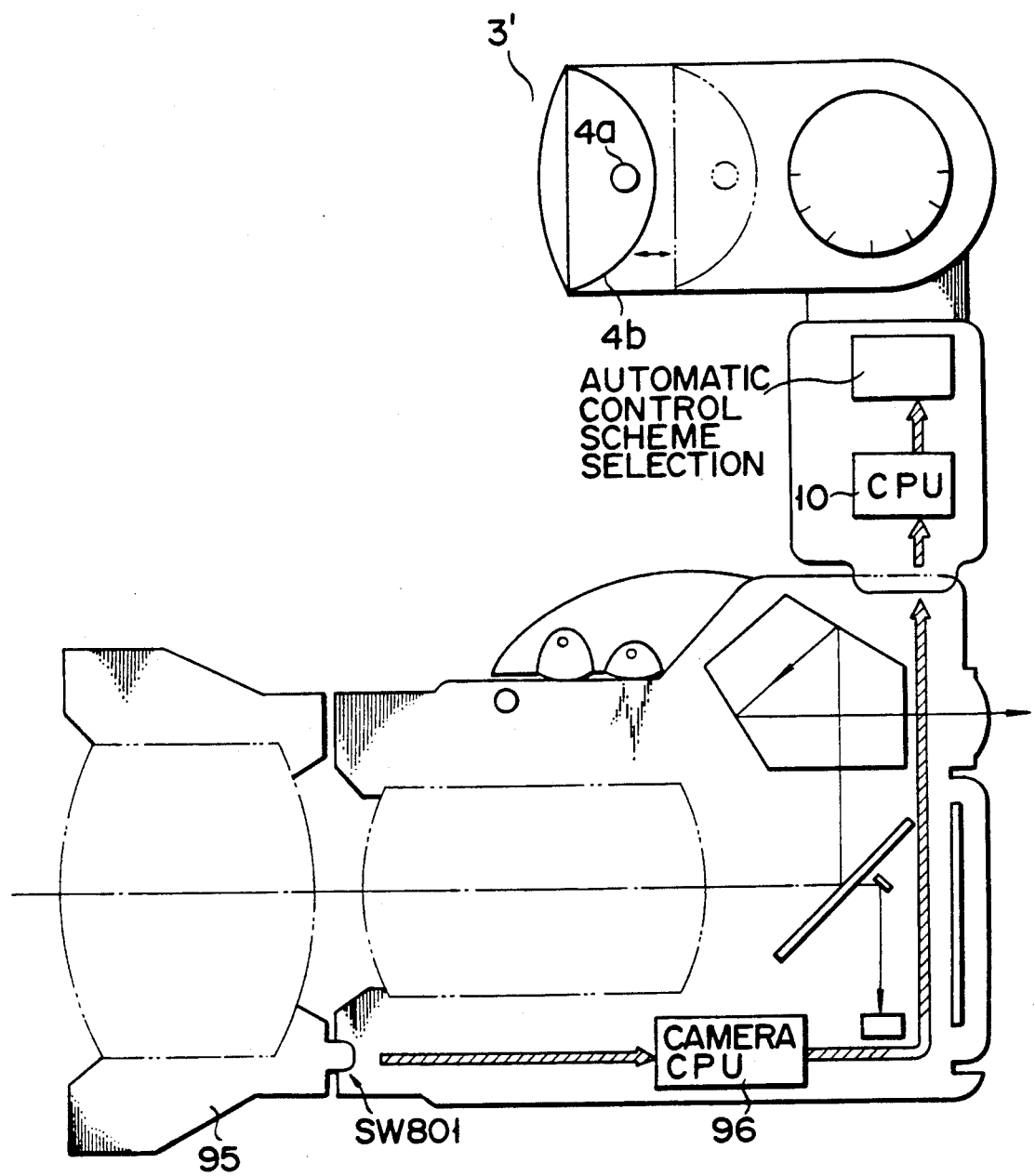
FIG. 29 is a side view showing a case wherein the flash apparatus is used while it is coupled to the camera on which a front converter is mounted.

A case wherein a converter is mounted on the camera will be described below. FIG. 29 shows a state wherein a converter 95 (a front converter in FIG. 29) is mounted on the photographing master lens 2 (shown as a part of the camera body). The above-mentioned switch SW801 is arranged on a portion of the photographing master lens 2. This switch SW801 is turned on when the converter 95 is mounted on the photographing master lens 2. The ON/OFF state of the switch SW801 is determined by a camera CPU 96. The determination result from the camera CPU 96 is then transmitted to the flash apparatus CPU 10 through the hot shoe 62 of the coupling means 60 on the flash apparatus side or the connector 61 of the cord connecting portion 63. With this transmission, the flash apparatus CPU 10 forcibly switches the light emission mode to the second control means 6. Data from the switch SW801 is to be added as part of data transmitted from the camera 1 to the flash apparatus 3, and is to be assigned to the 37th bit after the above-mentioned 36-bit data (a detailed description thereof will be omitted).

FIG. 30 is a flow chart showing a communication operation of data from the switch SW801 to the flash apparatus CPU 10. When the converter 95 is mounted on the photographing master lens 2 (step S51), the switch SW801 of the camera 1 is turned on (step S52). The CPU 96 reads an ON state of the switch SW801 (Step S53), and transmits a converter mounting signal CONV. ON through the hot shoe 62 (step S54). Upon reception of the signal CONV. ON, the flash apparatus CPU 10 determines that the switch SW801 is turned on (step S55).

Figure 26:
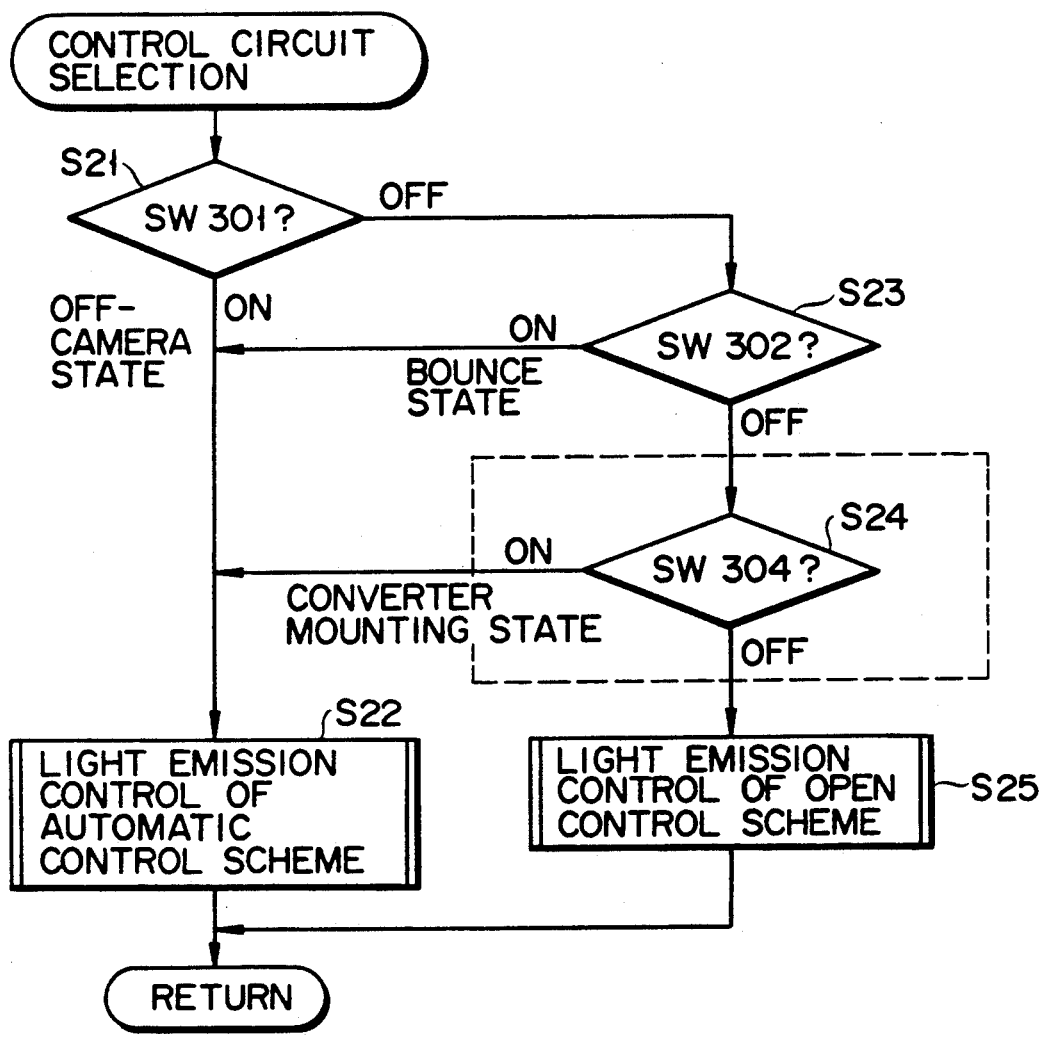
FIG. 26 is a flow chart showing a detailed control circuit selection routine in the flow chart shown i FIG. 25.

With this operation, the CPU 10 can perform ON/OFF determination of the switch SW801 in place of ON/OFF determination of the switch SW304 in step S24 in FIG. 26 (step S24'). If the switch SW801 is turned on, since it means that the converter is mounted on the photographing master lens 2, the subroutine of "light emission control of automatic control scheme" in step S22 is executed. If it is turned off, the subroutine of "light emission control of open control scheme" is executed. When the above-described automatic control scheme is to be performed, a metering element should be set in the following manner. When a front converter is to be used, the metering element may be set at the front surface of the flash apparatus, at the front surface of the camera main body, or at a position where light transmitted through the photographing lens of the camera is metered. When a rear converter is to be used, however, since the aperture value is changed, the setting position of the metering element is limited to the position where light transmitted through the photographing lens is metered.

As described above, according to the flash apparatus of the present invention, when it is detected that the apparatus is used in a bounce state or an OFF-camera state, the apparatus is automatically switched to a light emission mode suitable for a corresponding use state on the basis of an output from each state detection means of the apparatus, an output from the converter mounting detection means arranged on the camera main body, a converter position arranged on the main switch of the apparatus, or the like. Unlike the prior art, a user need not manually switch the two light emission modes in accordance with each purpose of photography. Therefore, the user need not endure any operation load and can perform photographing operations in a fully automatic manner.

The present invention is not limited to the above-described embodiment. Various changes and modifications can be made within the spirit and scope of the invention. In the above embodiment, a single-lens reflex camera is exemplified. However, the present invention is not limited to this, and can be applied to a range finder camera. In addition, the flash apparatus itself may have a proper known arrangement.

As has been described above, according to the present invention, the light emission modes of the open control scheme and of the automatic control scheme are organically combined with each other, thereby realizing a new flash apparatus which can perform proper flashing operations by automatically switching the two light emission modes in accordance with each photographic condition, and eliminate the conventional drawbacks.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A flash apparatus comprising:
    a light-emitting portion detachably mountable on a camera main body;
    first control means for controlling a light emission amount of said light-emitting portion on the basis of a preset guide number;
    second control means for metering light reflected by an object to be photographed and for controlling the light emission amount of said light-emitting portion on the basis of the metering result;
    detection means for detecting when said light-emitting portion is detached from said camera main body; and
    selecting means for inhibiting said first control means from controlling the light emission amount of said light-emitting portion and for causing said second control means to control the light emission amount of said light-emitting portion when said detection means detects that said light-emitting portion is detached from said camera main body.

2. An apparatus according to claim 1, wherein said detection means includes switch means which is operated when an extension cord for connecting said flash apparatus to said camera main body is attached to said flash apparatus.

3. A flash apparatus comprising a light-emitting portion, and a capacitor for causing said light-emitting portion to flash, said apparatus further comprising:
    first control means for controlling a light emission amount of said light-emitting portion on the basis of a preset guide member;
    second control means for metering light reflected by an object to be photographed and for controlling the light emission amount of said flash apparatus on the basis of the metering result;

determining means for determining whether said capacitor is charged to a level allowing light emission corresponding to a guide number not less than a preset guide number, and for generating an output when said capacitor is charged to the level;

selecting means for selecting one of said first and second control means;

first display means, having an element which is set in a display state when said light-emitting portion emits light while said first control means is selected by said selecting means and the output is generated by said determining means; and second display means, having an element which is set in a display state when said second control means is selected by said selecting means and the light emission amount of said light-emitting portion is properly controlled by said second control means.

4. An apparatus according to claim 3, wherein said elements of said first and second display means comprise identical light-emitting elements.

5. A photographing apparatus comprising a camera main body and an electronic flash unit which can be selectively set in a first state, in which said electronic flash unit is integrally connected to said camera main body, and a second state, in which said electronic flash unit is electrically connected to said camera main body through a connecting cord but mechanically detached therefrom, said apparatus further comprising:

first control means for determining a light emission amount of said flash unit on the basis of a distance to an object to be photographed and a preset aperture value;

second control means for determining the light emission amount of said flash unit on the basis of an output from a metering element for metering light reflected by the object;

detection means for generating an output when said flash unit is in the second state; and selecting means for selectively setting said first and second control means in an operative state, and for selecting said second control means upon reception of the output from said detection means.

6. A photographing system comprising a camera including a photographing lens and a converter, such converter being detachably mountable on said photographing lens for changing functions of said photographing lens, and a flash unit to be mounted on said camera, said system further comprising:

first control means for controlling a light emission amount of said flash unit on the basis of a preset guide number;

second control means for metering light reflected by an object to be photographed through said photographing lens and for controlling the light emission amount of said flash unit on the basis of the metering result;

first detection means for detecting that a light emission axis of said flash unit is inclined with respect to an optical axis of said photographing lens, and for producing an output when said light emission axis of said flash unit is so inclined;

second detection means which is operated when said converter is mounted on said photographing lens, and for producing an output when said converter is mounted on said photographing lens;

third detection means for detecting that said flash unit is detached from said camera, and for producing an output when said flash unit is detached from said camera; and selecting means for inhibiting said first control means from controlling the light emission amount of said flash unit and for causing said second control means to control the light emission amount of said flash unit, upon receipt of one of said outputs of said first, second and third detection means.

7. A system according to claim 6, wherein said second detection means includes a manual switching operation member arranged in said flash unit.

8. A system according to claim 6, wherein said second detection means includes switch means which is operated when said converter is mounted on said photographing lens.

* * * * *